(12) United States Patent
Vamos et al.

(10) Patent No.: US 7,445,859 B2
(45) Date of Patent: *Nov. 4, 2008

(54) ORGANIC FUEL CELL METHODS AND APPARATUS

(75) Inventors: Eugene Vamos, Somerville, MA (US); Subbarao Surampudi, Glendora, CA (US); Sekharipuram R. Narayanan, Altadena, CA (US); Harvey A. Frank, Encino, CA (US); Gerald Halpert, Pasadena, CA (US); George A. Olah, Beverly Hills, CA (US); G. K. Surya Prakash, Hacienda Heights, CA (US)

(73) Assignee: California Institute of Technology, Pasadena, CA (US)

( * ) Notice: Subject to any disclaimer, the term of this patent is extended or adjusted under 35 U.S.C. 154(b) by 598 days.

This patent is subject to a terminal disclaimer.

(21) Appl. No.: 10/857,587

(22) Filed: May 27, 2004

(65) Prior Publication Data

US 2004/0224214 A1  Nov. 11, 2004

Related U.S. Application Data

(60) Continuation of application No. 09/881,309, filed on Jun. 13, 2001, now Pat. No. 6,821,659, which is a division of application No. 08/478,801, filed on Jun. 7, 1995, now Pat. No. 6,248,460, which is a continuation of application No. 08/135,007, filed on Oct. 12, 1993, now Pat. No. 5,599,638.

(51) Int. Cl.
  H01M 8/08  (2006.01)
  H01M 8/10  (2006.01)
(52) U.S. Cl. .............. 429/15; 429/30; 429/34
(58) Field of Classification Search .......... 429/15, 429/30, 34
  See application file for complete search history.

(56) References Cited

U.S. PATENT DOCUMENTS 3,013,098 A   12/1961   Hunger et al.

(Continued)

FOREIGN PATENT DOCUMENTS

DE    1 258 842    1/1968

(Continued)

OTHER PUBLICATIONS

Zawodzinski et al., "Methanol Cross-Over in DMFC'S: Development of Strategies for Minimization", Extended Abstracts Spring Meeting 1994 St. Louis, MO, vol. 94/2, p. 960, 1992, no month.

(Continued)

*Primary Examiner*—Stephen J. Kalafut
(74) *Attorney, Agent, or Firm*—Law Office SC Harris

(57) ABSTRACT

A liquid organic, fuel cell is provided which employs a solid electrolyte membrane. An organic fuel, such as a methanol/water mixture, is circulated past an anode of a cell while oxygen or air is circulated past a cathode of the cell. The cell solid electrolyte membrane is preferably fabricated from Nafion™. Additionally, a method for improving the performance of carbon electrode structures for use in organic fuel cells is provided wherein a high surface-area carbon particle/Teflon™-binder structure is immersed within a Nafion™/methanol bath to impregnate the electrode with Nafion™. A method for fabricating an anode for use in a organic fuel cell is described wherein metal alloys are deposited onto the electrode in an electro-deposition solution containing perfluorooctanesulfonic acid. A fuel additive containing perfluorooctanesulfonic acid for use with fuel cells employing a sulfuric acid electrolyte is also disclosed. New organic fuels, namely, trimethoxymethane, dimethoxymethane, and trioxane are also described for use with either conventional or improved fuel cells.

41 Claims, 13 Drawing Sheets

U.S. PATENT DOCUMENTS

| | | | |
|---|---|---|---|
| 3,013,908 A | 12/1961 | Luck et al. | |
| 3,113,049 A | 12/1963 | Worsham | |
| 3,143,440 A | 8/1964 | Hunger et al. | |
| 3,368,922 A | 2/1968 | Salyer | |
| 3,388,922 A | 6/1968 | Gembruch | |
| 3,425,873 A | 2/1969 | Worsham et al. | |
| 3,442,715 A | 5/1969 | Yee et al. | |
| 3,511,713 A | 5/1970 | Warzawski | |
| 3,532,556 A | 10/1970 | Steele | |
| 3,542,597 A | 11/1970 | Smith et al. | |
| 3,615,835 A * | 10/1971 | Erickson | 429/35 |
| 3,634,140 A | 1/1972 | Von Krusenstierna | |
| 3,811,817 A | 5/1974 | Mansnerus et al. | |
| 3,899,354 A | 8/1975 | Kordesch | |
| 3,982,962 A | 9/1976 | Bloomfield | |
| 3,992,223 A | 11/1976 | Gutbier | |
| 3,993,985 A | 11/1976 | Chopard et al. | |
| 4,040,435 A * | 8/1977 | Elzinga | 429/14 |
| 4,080,791 A | 3/1978 | Nadler et al. | |
| 4,125,676 A | 11/1978 | Maricle et al. | |
| 4,130,484 A | 12/1978 | Marwil et al. | |
| 4,160,856 A | 7/1979 | Warszawski | |
| 4,175,165 A | 11/1979 | Adlhart | |
| 4,214,969 A | 7/1980 | Lawrance | |
| 4,262,063 A | 4/1981 | Kudo et al. | |
| 4,350,608 A | 9/1982 | Gestaut | |
| 4,365,008 A | 12/1982 | DeCasperis et al. | |
| 4,390,603 A | 6/1983 | Kawana et al. | |
| 4,395,322 A | 7/1983 | Harris | |
| 4,407,905 A | 10/1983 | Takeuchi et al. | |
| 4,420,544 A | 12/1983 | Lawson et al. | |
| 4,478,917 A | 10/1984 | Fujita et al. | |
| 4,490,219 A | 12/1984 | Bindra et al. | |
| 4,493,878 A | 1/1985 | Horiba et al. | |
| 4,517,259 A | 5/1985 | Lance | |
| 4,526,843 A | 7/1985 | Kaufman et al. | |
| 4,537,840 A | 8/1985 | Tsukui et al. | |
| 4,541,905 A | 9/1985 | Kuwana et al. | |
| 4,562,123 A | 12/1985 | Shimizu et al. | |
| 4,588,661 A | 5/1986 | Kaufman et al. | |
| 4,595,642 A | 6/1986 | Nakanishi et al. | |
| 4,612,261 A | 9/1986 | Tsukui et al. | |
| 4,619,753 A | 10/1986 | Christen et al. | |
| 4,625,395 A | 12/1986 | Rowlette | |
| 4,629,664 A | 12/1986 | Tsukui et al. | |
| 4,644,751 A | 2/1987 | Iisu | |
| 4,658,499 A | 4/1987 | Rowlette | |
| 4,728,533 A | 3/1988 | Feigenbaum et al. | |
| 4,729,889 A | 3/1988 | Flytani-Stephanopoulos et al. | |
| 4,729,932 A * | 3/1988 | McElroy | 429/13 X |
| 4,738,903 A | 4/1988 | Garow et al. | |
| 4,745,953 A | 5/1988 | Kobayashi et al. | |
| 4,766,043 A | 8/1988 | Shirogami et al. | |
| 4,769,297 A * | 9/1988 | Reiser et al. | 429/30 X |
| 4,810,597 A | 3/1989 | Kumagai et al. | |
| 4,824,736 A | 4/1989 | Ehrig et al. | |
| 4,824,739 A | 4/1989 | Breault et al. | |
| 4,826,741 A | 5/1989 | Aldhart et al. | |
| 4,828,941 A | 5/1989 | Sterzel | |
| 4,829,017 A | 5/1989 | Malhi | |
| 4,855,193 A | 8/1989 | McElroy | |
| 4,865,925 A | 9/1989 | Ludwig et al. | |
| 4,868,073 A | 9/1989 | Hashimoto et al. | |
| 4,876,115 A | 10/1989 | Raistrick | |
| 4,877,694 A * | 10/1989 | Solomon et al. | 429/27 |
| 4,898,631 A | 2/1990 | Collins, Jr. | |
| 4,920,475 A | 4/1990 | Rippel | |
| 4,931,168 A | 6/1990 | Watanabe et al. | |
| 4,957,673 A | 9/1990 | Schroeder et al. | |
| 4,961,918 A | 10/1990 | Norell et al. | |
| 5,004,424 A | 4/1991 | Larminie | |
| 5,013,618 A | 5/1991 | Luczak | |
| 5,019,263 A | 5/1991 | Haag et al. | |
| 5,057,362 A | 10/1991 | Schroeder et al. | |
| 5,084,144 A * | 1/1992 | Reddy et al. | 429/12 X |
| 5,132,193 A | 7/1992 | Reddy et al. | |
| 5,134,043 A | 7/1992 | Nakazawa | |
| 5,162,166 A | 11/1992 | Ellgen | |
| 5,170,124 A | 12/1992 | Blair et al. | |
| 5,175,064 A | 12/1992 | Labinger et al. | |
| 5,186,806 A | 2/1993 | Clark et al. | |
| 5,186,877 A | 2/1993 | Watanabe | |
| 5,211,984 A | 5/1993 | Wilson | |
| 5,225,391 A | 7/1993 | Stonehart et al. | |
| 5,234,776 A | 8/1993 | Koseki | |
| 5,236,687 A | 8/1993 | Fukuda et al. | |
| 5,250,184 A | 10/1993 | Maier | |
| 5,252,410 A | 10/1993 | Wilkinson et al. | |
| 5,252,528 A | 10/1993 | Voecks et al. | |
| 5,294,232 A | 3/1994 | Sakairi et al. | |
| 5,294,580 A | 3/1994 | Dufner | |
| 5,308,465 A | 5/1994 | Hillrichs et al. | |
| 5,318,863 A | 6/1994 | Dhar | |
| 5,330,860 A | 7/1994 | Grot et al. | |
| 5,335,628 A | 8/1994 | Dunbar | |
| 5,364,711 A | 11/1994 | Yamada et al. | |
| 5,366,821 A | 11/1994 | Merritt et al. | |
| 5,401,589 A | 3/1995 | Palmer et al. | |
| 5,409,785 A | 4/1995 | Nakano et al. | |
| 5,415,888 A | 5/1995 | Banerjee et al. | |
| 5,431,789 A | 7/1995 | Huber et al. | |
| 5,436,086 A | 7/1995 | Seymour et al. | |
| 5,449,479 A | 9/1995 | Clark et al. | |
| 5,453,332 A | 9/1995 | Sakairi et al. | |
| 5,478,662 A | 12/1995 | Strasser | |
| 5,482,792 A | 1/1996 | Faita et al. | |
| 5,550,478 A | 8/1996 | Kopera | |
| 5,561,000 A | 10/1996 | Dirven et al. | |
| 5,573,866 A | 11/1996 | Van Dine et al. | |
| 5,598,088 A | 1/1997 | Richter | |
| 5,599,638 A * | 2/1997 | Surampudi et al. | 429/33 |
| 5,603,830 A | 2/1997 | Everhart et al. | |
| 5,641,586 A | 6/1997 | Wilson | |
| 5,656,388 A | 8/1997 | Bugga et al. | |
| 5,658,682 A | 8/1997 | Usuda et al. | |
| 5,679,248 A | 10/1997 | Blaney | |
| 5,698,089 A | 12/1997 | Lewis et al. | |
| 5,702,755 A | 12/1997 | Mussell | |
| 5,733,437 A | 3/1998 | Baker et al. | |
| 5,766,786 A | 6/1998 | Fleck et al. | |
| 5,773,162 A | 6/1998 | Surampudi et al. | |
| 5,795,496 A | 8/1998 | Yen et al. | |
| 5,814,995 A | 9/1998 | Tasdighi | |
| 5,858,569 A | 1/1999 | Meacher et al. | |
| 5,888,665 A | 3/1999 | Bugga et al. | |
| 5,916,505 A | 6/1999 | Cisar et al. | |
| 5,928,807 A | 7/1999 | Elias | |
| 5,935,431 A | 8/1999 | Korin | |
| 5,945,231 A | 8/1999 | Narayanan et al. | |
| 5,992,008 A | 11/1999 | Kindler | |
| 6,027,630 A | 2/2000 | Cohen | |
| 6,136,463 A | 10/2000 | Kindler et al. | |
| 6,146,781 A | 11/2000 | Surampudi et al. | |
| 6,150,047 A | 11/2000 | Yen et al. | |
| 6,171,721 B1 | 1/2001 | Narayanan et al. | |
| 6,221,523 B1 | 4/2001 | Chun et al. | |
| 6,228,518 B1 | 5/2001 | Kindler | |
| 6,248,460 B1 | 6/2001 | Surampudi et al. | |
| 6,254,748 B1 | 7/2001 | Surampudi et al. | |
| 6,258,476 B1 | 7/2001 | Cipollini | |
| 6,265,093 B1 | 7/2001 | Surampudi et al. | |
| 6,277,447 B1 | 8/2001 | Chun et al. | |
| 6,291,093 B1 | 9/2001 | Kindler et al. | |
| 6,299,744 B1 | 10/2001 | Narayanan et al. | |

| Patent/Pub No. | Date | Inventor |
|---|---|---|
| 6,303,244 B1 | 10/2001 | Surampudi et al. |
| 6,306,285 B1 | 10/2001 | Narayanan et al. |
| 6,368,492 B1 | 4/2002 | Narayanan et al. |
| 6,391,486 B1 | 5/2002 | Narayanan et al. |
| 6,399,235 B1 | 6/2002 | Yen et al. |
| 6,420,059 B1 | 7/2002 | Surampudi et al. |
| 6,432,284 B1 | 8/2002 | Narayanan et al. |
| 6,440,594 B1 | 8/2002 | Kindler et al. |
| 6,444,341 B1 | 9/2002 | Yen et al. |
| 6,444,343 B1 | 9/2002 | Prakash et al. |
| 6,458,319 B1 | 10/2002 | Caillat et al. |
| 6,468,684 B1 | 10/2002 | Chisholm et al. |
| 6,475,369 B1 | 11/2002 | Cohen |
| 6,485,851 B1 | 11/2002 | Narayanan et al. |
| 6,533,919 B1 | 3/2003 | Narayanan et al. |
| 6,579,068 B2 | 6/2003 | Bridger et al. |
| 6,589,684 B1 | 7/2003 | Surampudi et al. |
| 6,613,972 B2 | 9/2003 | Cohen et al. |
| 6,621,687 B2 | 9/2003 | Lewis, Jr. et al. |
| 6,680,139 B2 | 1/2004 | Narayanan et al. |
| 6,699,021 B2 | 3/2004 | McNamee et al. |
| 6,703,150 B2 | 3/2004 | Surampudi et al. |
| 6,740,434 B2 | 5/2004 | Surampudi et al. |
| 6,756,145 B2 | 6/2004 | Narayanan et al. |
| 6,790,377 B1 | 9/2004 | Cohen |
| 6,821,659 B2 | 11/2004 | Surampudi et al. |
| 7,056,428 B2 | 6/2006 | Narayanan et al. |
| 2001/0028975 A1 | 10/2001 | Narayanan et al. |
| 2001/0050230 A1 | 12/2001 | Surampudi et al. |
| 2001/0052389 A1 | 12/2001 | Chun et al. |
| 2002/0015872 A1 | 2/2002 | Surampudi et al. |
| 2002/0058178 A1 | 5/2002 | Narayanan et al. |
| 2003/0008190 A1 | 1/2003 | Chisholm et al. |
| 2003/0066476 A1 | 4/2003 | Caillat et al. |
| 2003/0207167 A1 | 11/2003 | Prakash et al. |
| 2003/0226763 A1 | 12/2003 | Narayanan et al. |
| 2004/0166397 A1 | 8/2004 | Valdez et al. |
| 2004/0224214 A1 | 11/2004 | Vamos et al. |
| 2004/0229108 A1 | 11/2004 | Valdez et al. |
| 2004/0234834 A1 | 11/2004 | Narayanan et al. |
| 2005/0003254 A1 | 1/2005 | Surampudi et al. |
| 2005/0042487 A1 | 2/2005 | Surampudi et al. |
| 2005/0214629 A1 | 9/2005 | Narayanan et al. |
| 2006/0046133 A1 | 3/2006 | Surampudi et al. |
| 2006/0105210 A1 | 5/2006 | Surampudi et al. |
| 2006/0204810 A1 | 9/2006 | Surampudi et al. |
| 2006/0216576 A1 | 9/2006 | Karayanan et al. |

FOREIGN PATENT DOCUMENTS

| | | |
|---|---|---|
| DE | 1 907 737 | 8/1970 |
| DE | 41 16 359 | 11/1992 |
| DE | 4243600 | 7/1993 |
| EP | 0 072 038 | 2/1983 |
| EP | 0 154 772 | 9/1985 |
| EP | 0 181 569 | 5/1986 |
| EP | 0241432 | 10/1987 |
| EP | 0 248 394 | 12/1987 |
| EP | 0 301 757 | 2/1989 |
| EP | 0 426 546 | 5/1991 |
| EP | 0 435 724 | 7/1991 |
| EP | 0 448 719 | 10/1991 |
| EP | 0 483 085 | 4/1992 |
| EP | 0 546 594 | 6/1993 |
| EP | 0 589 535 | 3/1994 |
| EP | 0 596 366 | 5/1994 |
| EP | 0 642 185 | 3/1995 |
| EP | 0 764 466 | 3/1997 |
| FR | 1436154 | 7/1966 |
| FR | 1 512 263 | 2/1968 |
| GB | 1 082 575 | 9/1967 |
| GB | 1 160 084 | 7/1969 |
| GB | 1 213 777 | 11/1970 |
| GB | 1 221 683 | 2/1971 |
| GB | 1 258 153 | 12/1971 |
| GB | 1 304 092 | 1/1973 |
| GB | 1 534 015 | 11/1978 |
| JP | 54076443 | 6/1979 |
| JP | 56-118273 | 9/1981 |
| JP | 57-019973 | 2/1982 |
| JP | 57-196479 | 12/1982 |
| JP | 58-004274 | 1/1983 |
| JP | 58-016471 | 1/1983 |
| JP | 58-034573 | 3/1983 |
| JP | 58-165274 | 9/1983 |
| JP | 58-186170 | 10/1983 |
| JP | 59-157963 | 9/1984 |
| JP | 60-023977 | 2/1985 |
| JP | 59-209277 | 4/1985 |
| JP | 60-151969 | 8/1985 |
| JP | 60-165062 | 1/1986 |
| JP | 61-042871 | 3/1986 |
| JP | 61-058170 | 3/1986 |
| JP | 62-010872 | 1/1987 |
| JP | 62-064067 | 3/1987 |
| JP | 62-086662 | 4/1987 |
| JP | 62-208553 | 9/1987 |
| JP | 62-246265 | 10/1987 |
| JP | 62-296372 | 12/1987 |
| JP | 63-066860 | 3/1988 |
| JP | 63-076269 | 4/1988 |
| JP | 63-088860 | 4/1988 |
| JP | 63-076264 | 8/1988 |
| JP | 64-077876 | 3/1989 |
| JP | 01-146263 | 6/1989 |
| JP | 02-051865 | 2/1990 |
| JP | 02-098053 | 4/1990 |
| JP | 02-114452 | 4/1990 |
| JP | 02-148657 | 8/1990 |
| JP | 02-223984 | 9/1990 |
| JP | 03-145062 | 6/1991 |
| JP | 04-014473 | 1/1992 |
| JP | 04-132168 | 5/1992 |
| JP | 04-162365 | 6/1992 |
| JP | 04-229958 | 8/1992 |
| JP | 04-305249 | 10/1992 |
| JP | 05-135785 | 6/1993 |
| JP | 06-052871 | 2/1994 |
| JP | 06-073583 | 3/1994 |
| JP | 06-150937 | 5/1994 |
| JP | 06-188008 | 7/1994 |
| JP | 06-203840 | 7/1994 |
| JP | 06-236762 | 8/1994 |
| JP | 06-251780 | 9/1994 |
| JP | 06-275305 | 9/1994 |
| JP | 6251779 | 9/1994 |
| WO | WO92/02965 | 2/1992 |
| WO | WO94/11914 | 5/1994 |
| WO | WO94/16811 | 8/1994 |
| WO | WO95/06335 | 3/1995 |
| WO | WO97/21256 | 6/1997 |

OTHER PUBLICATIONS

Watanabe, Improvement of perfomance and durability of anode for direct methanol fuel cells, 1992, Proceedings of the Workshop on Direct Methanol Air Fuel Cells, vol. 92-14, no month.

Watanabe et al., "Electrocatalysts for Methanol Electrooxidation", J. Electroanal. Chem., 284 (1990) 511-515, no month.

Watanabe et al., "Applications of the Gas Diffusion Electrode to a Backward Feed and Exhaust (BFE) Type Methanol Anode", J. Electroanal. Chem., 199 (1986), 311-322, no month.

Tsukui, et al., "Study on Methanol Fuel Cell With Hydrocarbon High-Molecular Polymer Electrolyte", *Journal of The Electrochemical Society of Japan*, vol. 59, No. 1 (1991), pp. 52-58 (translation included), no month.

Surampudi et al., "Advances in direct oxidation methanol fuel cells", Jan. 1994, Journal of Power Sources, vol. 47, No. 3, pp. 377-385.

P.J. Skerrett, "Fuel Cell Update", Popular Science, Jun. 1993.

Poltarzewski et al., "Nafion distribution in gas diffusion electrodes for solid-polymer—electrolyte-fuel-cell applications", Mar. 1992, Journal of Electrochemical Society, vol. 139, No. 9, pp. 761-765.

Narayanan et al., "Implications of Fuel Crossover in Direct Methanol Fuel Cells", Extended Abstracts Fall Meeting Oct. 10-15, vol. 93/2, pp. 126/127, New Orleans 1993, no month.

Narayanan et al., "Studies on the electro-oxidation of methanol and formaldehyde at carbon-supported platinum and platinum alloy electrodes", 1992, Extended Abstracts Fall Meeting, vol. 92, No. 2, pp. 78-79, no month.

Kosek et al., "A Direct Methanol Oxidation Fuel Cell", Proceeding of the 28th Intersociety Energy Conversion Engineering Conference, vol. 1, pp. 1.1209-1.1214, Atlanta 1993, no month.

Hamnet et al., "Electrocatalysis and the Direct Methanol Fuel Cell", Chemistry and Industry Chemistry and Industry Review, No. 13, pp. 480-483, Jul. 6, 1992.

Abens, S., et al., "Methanol Fuel Cell Power Source", *Conf. Proc. Intelec. '85 Seventh International Telecommunications Energy Conf.*, Oct. 14-17, 1985, Munich, West Germany, pp. 167-174 (Abstract Only).

Abens, S., et al., "Neat Methanol Fuel Cell Power Plant", *Proc. of the 20th Intersociety Energy Conversion Engineering Conf.*, vol. 2, pp. 191-196 (1985) (Abstract Only), no month.

Saito, et al., "Liquid Fuel Permeation Through Membrane in Ion-Exchange Membrane Type Liquid Fuel Cell", *Journal of The Electrochemical Society of Japan*, 59(1):70-73, (1991), filed with English Translation of Abstract, no month.

Takahashi, T., "The Solid Electrolytes for Fuel Cells", *Denki Kagaku*, 55(3):190-194 (1987), Abstract Only, no month.

Tsukui, T., et al., "Study on Fuel Supplying Method and Methanol Concentration Sensor for the High Efficient Operation of Methanol Fuel Cells", *Transactions of the Institute of Electrical Engineers of Japan, Part B*, 110-B(1):67-76, Jan. 1990 (Abstract Only).

Watanabe, et al., "The Use of Thin Films of Sulphonated Fluoro-Polymers for Improvements in the Activity and Durability of Pt Electrocatalysts for Methanol Electrooxidation", J. Electroanal. Chem., vol. 284, pp. 511-515 (1990), no month.

Ahlers, C., et al., "Fabrication of Zeolite-Modified Electrodes via Electrophoretic Deposition", *Journal of The Electrochemical Society*, 146(9):3259-3263, (1999), no month.

Cathro, K.J., et al., "Fuel Control in Methanol-Air and Formaldehyde-Air Fuel Cell Systems", *J. Electrochem. Soc.*, 118(9):1523-1529, Sep. 1971.

Kawashima, A., et al., "Surface-Activated Amorphous Alloy Fuel Electrodes for Methanol Fuel Cell", *Science Reports of the Research Institutes*, Tohoku University, Japan, Series A: Physics, Chemistry, and Metallurgy, 31(1):174-182, no date.

Shukla, A.K., et al., "A Nafion-bound platinized carbon electrode for oxygen reduction in solid polymer electrolyte cells", *Journal of Applied Electrochemistry*, 19 (1989) 383-386, no month.

Si, Y., et al., "Nafion-Teflon-Zr($HPO_4$)$_2$ Composite Membranes for High-Temperature PEMFCs", *Journal of The Electrochemical Society*, 151(4):A623-A631, (2004), no month.

Takeuchi, K., et al., "A Capacitance Sensor for Methanol Ratio Measurement of Blended Gasoline", *International Conference on Automotive Electronics*, London, GB, pp. 24-28, 1991, no month.

* cited by examiner

302

IMMERSE THE CARBON ELECTRODE STRUCTURE IN 1% SOLUTION OF NAFION IN METHANOL FOR ABOUT 5 MINUTES TO ACHIEVE IMPREGNATION OF THE NAFION INTO THE ELECTRODE TO A LOADING OF $0.1 - 0.5 \, mg/cm^2$.

304

REMOVE ELECTRODE FROM SOLUTION AND DRY IN VACUUM.

FIG. 7 though the use of the ionically conducting layer helps reduce crossover, the ionically conducting layer is used only in conjunction with a sulfuric acid electrolyte. Hence, the fuel cell suffers from the various aforementioned disadvantages of using sulfuric acid as an electrolyte.
ORGANIC FUEL CELL METHODS AND APPARATUS

CROSS-REFERENCE TO RELATED APPLICATIONS

This application is a continuation of U.S. patent application Ser. No. 09/881,309, filed Jun. 13, 2001 now U.S. Pat. No. 6,821,659, which is a divisional application of U.S. application Ser. No. 08/478,801, filed Jun. 7, 1995 (now U.S. Pat. No. 6,248,460), which is a continuation application of U.S. application Ser. No. 08/135,007, filed Oct. 12, 1993 (now U.S. Pat. No. 5,599,638).

ORIGIN OF THE INVENTION

The invention described herein was made in the performance of work under a NASA contract, and is subject to the provisions of Public LAW 96-517 (35 USC 202) in which the Contractor has elected to retain title.

BACKGROUND OF THE INVENTION

1. Technical Field

The invention generally relates to organic fuel cells and in particular liquid feed organic fuel cells.

2. Background Art

Fuel cells are electrochemical cells in which a free energy change resulting from a fuel oxidation reaction is converted into electrical energy. In an organic/air fuel cell, an organic fuel such as methanol, formaldehyde, or formic acid is oxidized to carbon dioxide at an anode, while air or oxygen is reduced to water at a cathode. Fuel cells employing organic fuels are extremely attractive for both stationary and portable applications, in part, because of the high specific energy of the organic fuels, e.g., the specific energy of methanol is 6232 Wh/kg.

Two types of organic/air fuel cells are generally known:

1. An "indirect" or "reformer" fuel cell in which the organic fuel is catalytically reformed and processed into carbon monoxide-free hydrogen, with the hydrogen so obtained oxidized at the anode of the fuel cell.

2. A "direct oxidation" fuel cell in which the organic fuel is directly fed into the fuel cell without any previous chemical modification where the fuel is oxidized at the anode.

Direct oxidation fuel cells do not require a fuel processing stage. Hence, direct oxidation fuel cells offer a considerable weight and volume advantage over the indirect fuel cells. Direct oxidation fuel cells use either a vapor or a liquid feed of the organic fuel. Current art direct oxidation fuel cells that have shown promise typically employ a liquid feed design in which a liquid mixture of the organic fuel and a sulfuric acid electrolyte is circulated past the anode of the fuel cell.

The use of sulfuric acid electrolyte in the current-art direct methanol fuel cells presents several problems. The use of sulfuric acid, which is highly corrosive, places significant constraints on the materials of construction of the fuel cell. Typically, expensive corrosion resistant materials are required. Sulfate anions, created within the fuel cell, have a strong tendency to adsorb on the electrocatalyst, thereby hindering the kinetics of electro-oxidation of the fuel and resulting in poor performance of the fuel electrode. Also, sulfuric acid tends to degrade at temperatures greater than 80° C. and the products of degradation usually contain sulfur which can poison the electrocatalyst. In multi-cell stacks, the use of sulfuric acid electrolyte can result in parasitic shunt currents.

Exemplary fuel cells of both the direct and indirect types are described in U.S. Pat. Nos. 3,013,908; 3,113,049; 4,262,063; 4,407,905; 4,390,603; 4,612,261; 4,478,917; 4,537,840; 4,562,123; and 4,629,664.

U.S. Pat. Nos. 3,013,908 and 3,113,049, for example, describe liquid feed direct methanol fuel cells using a sulfuric acid electrolyte. U.S. Pat. Nos. 4,262,063, 4,390,603, 4,478,917 and 4,629,664 describe improvements to sulfuric acid-based methanol fuel cells wherein a high molecular weight electrolyte or a solid proton conducting membrane is interposed between the cathode and the anode as an ionically conducting layer to reduce crossover of the organic fuel from the anode to the cathode. Although the use of the ionically conducting layer helps reduce crossover, the ionically conducting layer is used only in conjunction with a sulfuric acid electrolyte. Hence, the fuel cell suffers from the various aforementioned disadvantages of using sulfuric acid as an electrolyte.

In view of the aforementioned problems associated with using sulfuric acid as an electrolyte, it would be desirable to provide a liquid feed fuel cell that does not require sulfuric acid as an electrolyte.

In addition to the improvements in operational characteristics of the liquid feed fuel cell, the conventional method of fabricating high-surface-area electro-catalytic electrodes for use such fuel cells also needs to be improved. The existing method of fabrication of fuel cell electrodes is a fairly time-consuming and expensive procedure. Specifically, electrode fabrication requires that a high surface-area carbon-supported alloy powder be initially prepared by a chemical method which usually requires about 24 hours. Once prepared, the carbon supported alloy powder is combined with a Teflon™ binder and applied to a carbon fiber-based support to yield a gas diffusion electrode. To volatilize impurities arising out of the Teflon™ binder and to obtain a fibrous matrix of Teflon™, the electrodes are heated to 200-300° C. During this heating step, oxidation and sintering of the electrocatalyst can occur, resulting in a reduced activity of the surface of the electrode. Thus, the electrodes often require re-activation before use.

Also electrodes produced by conventional methods are usually of the gas-diffusion type and cannot be effectively used in liquid feed type fuel cells as the electrode is not adequately wetted by the liquid fuel. In general, the structure and properties of a fuel oxidation electrode (anode) for use in liquid feed type fuel cells are quite different from the gas/vapor feed fuel cells such as the hydrogen/oxygen fuel cell. The electrode structures for use in a liquid feed fuel cell should be very porous and the liquid fuel solution should wet all pores. Carbon dioxide that is evolved at the fuel electrode should be effectively released from the zone of reaction. Adequate wetting of the electrodes is a major problem for liquid feed fuel cells—even for those which use a sulfuric acid electrolyte.

As can be appreciated, it would be desirable to provide improved methods for fabricating electrodes, particularly for use in liquid feed fuel cells. It is also desirable to devise methods for modifying electrodes, originally adapted for gas-feed fuel cells, for use in liquid feed fuel cells.

In addition to improving the liquid feed fuel cell itself and for providing improved methods for fabricating the electrodes of fuel cell, it would be desirable to provide new effective fuels as well. In general, it is desirable to provide liquid fuels which undergo clean and efficient electrochemical oxidation within the fuel cell. The efficient utilization of organic fuels in direct oxidation fuel cells is, in general, governed by the ease by which the organic compounds are anodically oxidized within the fuel cell. Conventional organic fuels, such as methanol, present considerable difficulties with respect to electro-oxidation. In particular, the electro-oxidation of organic compounds such as methanol involves multiple electron transfer and is a very hindered process with several intermediate steps. These steps involve dissociative adsorption of the fuel molecule to form active surface species which undergo relatively facile oxidation. The ease of dissociative adsorption and surface reaction usually determines the facility of electro-oxidation. Other conventional fuels, such as formaldehyde, are more easily oxidized, but have other disadvantages as well. For example, formaldehyde is highly toxic. Also, formaldehyde is extremely soluble in water and therefore crosses over to the cathode of the fuel cell, thus reducing the performance of the fuel cell. Other conventional organic fuels, such as formic acid, are corrosive. Furthermore, many of the conventional organic fuels poison the electrodes of the fuel cell during electro-oxidation, thus preventing sustained operation. As can be appreciated, it would be desirable to provide improved fuels, particularly for use in liquid feed fuel cells, which overcome the disadvantages of conventional organic fuels, such as methanol, formaldehyde, and formic acid.

SUMMARY OF THE INVENTION

A general object of the invention is to provide an improved direct type liquid feed fuel cell. One particular object of the invention is to provide a direct type liquid feed fuel cell which does not require a sulfuric acid electrolyte. Another particular object of the invention is to achieve adequate wetting of electrodes for use in liquid feed fuel cells. Yet another particular object of the invention is to provide an improved method for wetting electrodes for use in fuel cells having sulfuric acid electrolytes. Still another particular object of the invention is to provide improved fuels for use in liquid feed fuel cells.

The object of providing an improved liquid feed direct fuel cell which does not require a sulfuric acid electrolyte is achieved in part by using a solid polymer electrolyte membrane in combination with a battery-type anode that is porous and is capable of wetting the fuel. In the improved liquid feed fuel cell, a battery-type anode structure and a cathode are bonded to either side of the solid polymer proton-conducting membrane forming a membrane-electrode assembly. A solution of methanol and water which is substantially free of sulfuric acid is circulated past the anode side of the assembly.

A solid polymer membrane is used, in part, because such membranes have excellent electrochemical and mechanical stability, high ionic conductivity, and can function both as an electrolyte and as a separator. Also, the kinetics of electro-oxidation of methanol and electro-reduction of air or oxygen are more facile at an electrode/membrane-electrolyte interface as compared to an electrode/sulfuric acid interface. The use of the membrane permits operation of the fuel cell at temperatures as high as 120° C. Since the fuel and water solution is substantially free of sulfuric acid, there is no need for expensive corrosion-resistant components in the fuel cell and its accessories. Also the absence of conducting ions in the fuel and water solutions, which can exist when a sulfuric acid electrolyte is employed, substantially eliminates the possibility of any parasitic shunt currents in a multi-cell stack.

The solid polymer electrolyte is preferably a proton-conducting cation-exchange membrane, such as the perflourinated sulfonic acid polymer membrane, Nafion™. Nafion™ is a copolymer of tetrafluoroethylene and perfluorovinylether sulfonic acid. Membranes of modified perflourinated sulfonic acid polymer, polyhydrocarbon sulfonic acid and composites of two or more kinds of proton exchange membranes can also be used.

The anode is preferably formed from high surface area particles of platinum-based alloys of noble and non-noble metals. Binary and ternary compositions can be used for the electro-oxidation of organic fuels. Platinum-ruthenium alloy, with compositions varying from 10-90 atom percent of platinum, is the preferred anode electrocatalyst for the electro-oxidation of methanol. The alloy particles are either in the form of fine metal powders, i.e., "unsupported", or are supported on high surface area carbon material.

Conventional fuel cell anode structures (gas diffusion type) are not suitable for use in liquid feed type organic/air fuel cells. These conventional electrodes have poor fuel wetting properties. These conventional electrodes can be modified for use in liquid feed type fuel cells by coating them with substances that improve their wetting properties. Nafion™ with an equivalent weight of 1000 or higher is the preferred substance. The additive decreases interfacial tension of the liquid/catalyst interface and leads to the uniform wetting of the electrode pores and particles by the fuel and water solution, yielding enhanced utilization of the electrocatalyst. In addition to improving wetting properties, Nafion™ additive also provides ionic continuity with the solid electrolyte membrane and permits efficient transport of protons or hydronium ions generated by the fuel oxidation reaction. Further, the additive facilitates the release of carbon dioxide from the pores of the electrode. By using a perfluorinated sulfonic acid as the additive, anionic groups are not strongly adsorbed on the electrode/electrolyte interface. Consequently, the kinetics of electro-oxidation of methanol are more facile than in sulfuric acid electrolyte. Other hydrophilic proton-conducting additives with the desired properties include montmorrolinite clay, alkoxycelluloses, cyclodextrins, mixtures of zeolites, and zirconium hydrogen phosphate.

The object of improving electrodes for operating in liquid feed fuel cells is achieved, in part, by using perfluorooctanesulfonic acid as an additive in an electro-deposition bath used in fabricating the electrode. An electro-deposition method using the perfluorooctanesulfonic acid additive comprises the steps of positioning a high-surface-area carbon electrode structure within a bath containing metallic salts, positioning an anode within the bath and applying a voltage between the anode and the cathode until a desired amount of metal becomes deposited onto the electrode. After deposition of the metal onto the electrode, the electrode is extracted from the bath and washed within deionized water.

Preferably, the metal salts include hydrogen hexachloroplatinate and potassium pentachloroaquoruthenium. The anode is composed of platinum. The carbon electrode structure includes high-surface-area carbon particles bound together by polytetrafluoroethylene, sold under the trademark Teflon™.

The object of providing for adequate wetting of an electrode within a liquid feed fuel cell having a sulfuric acid electrolyte is achieved by employing perfluorooctanesulfonic acid as an additive to the fuel mixture of the fuel cell. Preferably, the perfluorooctanesulfonic acid is added to the organic fuel and water mixture in concentrations from 0.001-0.1 M.

The general objective of providing new fuels for use in organic fuel cells is achieved by using either trimethoxymethane, dimethoxymethane or trioxane. All three new fuels can be oxidized at a high rate into carbon dioxide and water within the fuel cell without poisoning the electrodes. Furthermore, neither trimethoxymethane, dimethoxymethane or trioxane are corrosive. Rates of oxidation of the three new fuels are comparable to, or better than, oxidation rates of conventional organic fuels. For example, rates of oxidation for dimethoxymethane are higher than that of methanol, at the same temperature. Trioxane achieves oxidation rates comparable to that of formaldehyde. However, trioxane has a much higher molecular weight than formaldehyde and, as such, molecules of trioxane do not cross-over to the cathode of the fuel cell as easily as molecules of formaldehyde.

Trimethoxymethane, dimethoxymethane and trioxane may be employed in a fuel cell having any of the improvements set forth above. However, the improved fuels may also be advantageously used within other organic fuel cells, including entirely conventional fuel cells.

Hence the various general objects of the invention set forth above are achieved. Other objects and advantages of the invention will be apparent from the detailed description set forth below.

BRIEF DESCRIPTION OF DRAWINGS

The objects and advantages of the present invention will become more readily apparent after reviewing the following detailed description and accompanying drawings, wherein:

FIG. 7 is a block diagram illustrating a method for fabricating electrode containing hydrophilic proton-conducting ionomer additive for use in liquid feed cells.

DETAILED DESCRIPTION OF THE INVENTION

Referring to the figures, the preferred embodiments of the invention will now be described. Initially, an improved liquid feed organic fuel Cell using a solid polymeric electrolyte membrane and a ionomeric anode additive is described, primarily with reference to FIGS. 1-6. Then, a method for fabricating the anode having the ionomeric additive is described with reference to FIGS. 7-8. A method for achieving improved wetting by fabricating an electrode within a bath containing perfluorooctanesulfonic acid is described with reference to FIGS. 9-11. A fuel cell employing perfluorooctanesulfonic acid as a fuel additive is described with reference to FIG. 12. Fuel cells employing dimethoxymethane, trimethoxymethane and trioxane as fuels are described with reference to FIGS. 13-21.

Fuel Cell Employing Solid Proton Conducting Elecrolyte Membrane.

Figure 1:
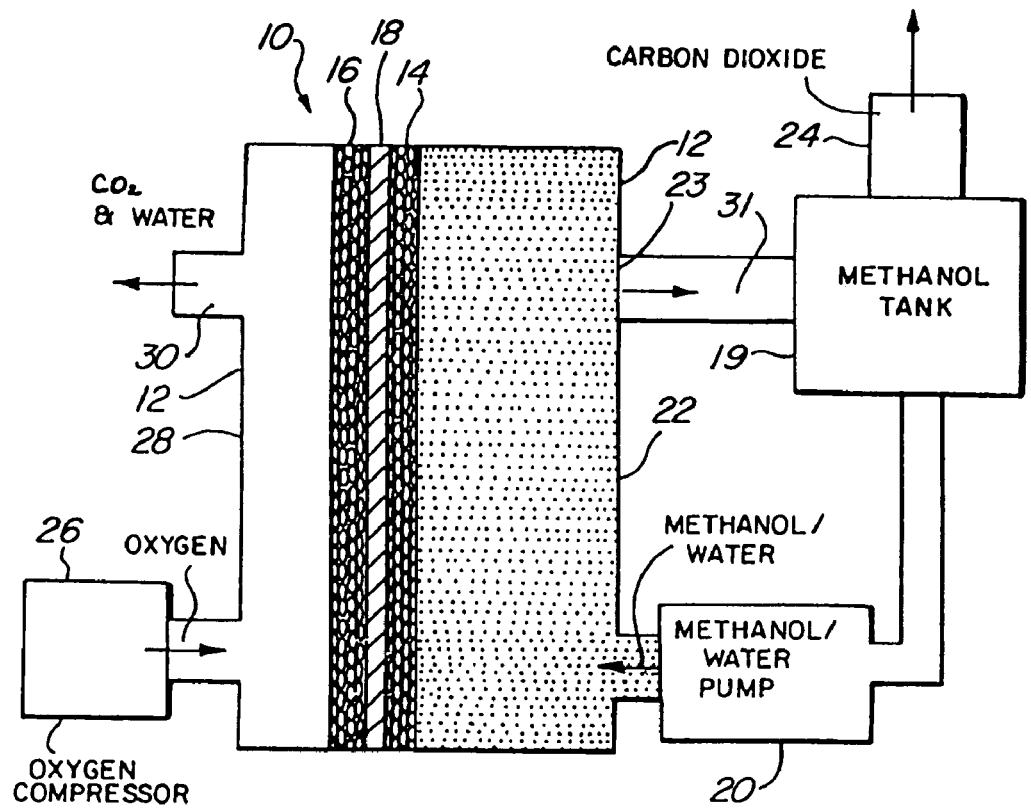
FIG. 1 provides a schematic representation of an improved liquid feed organic fuel cell having a solid polymeric membrane configured in accordance with a preferred embodiment of the invention.
Figure 2:
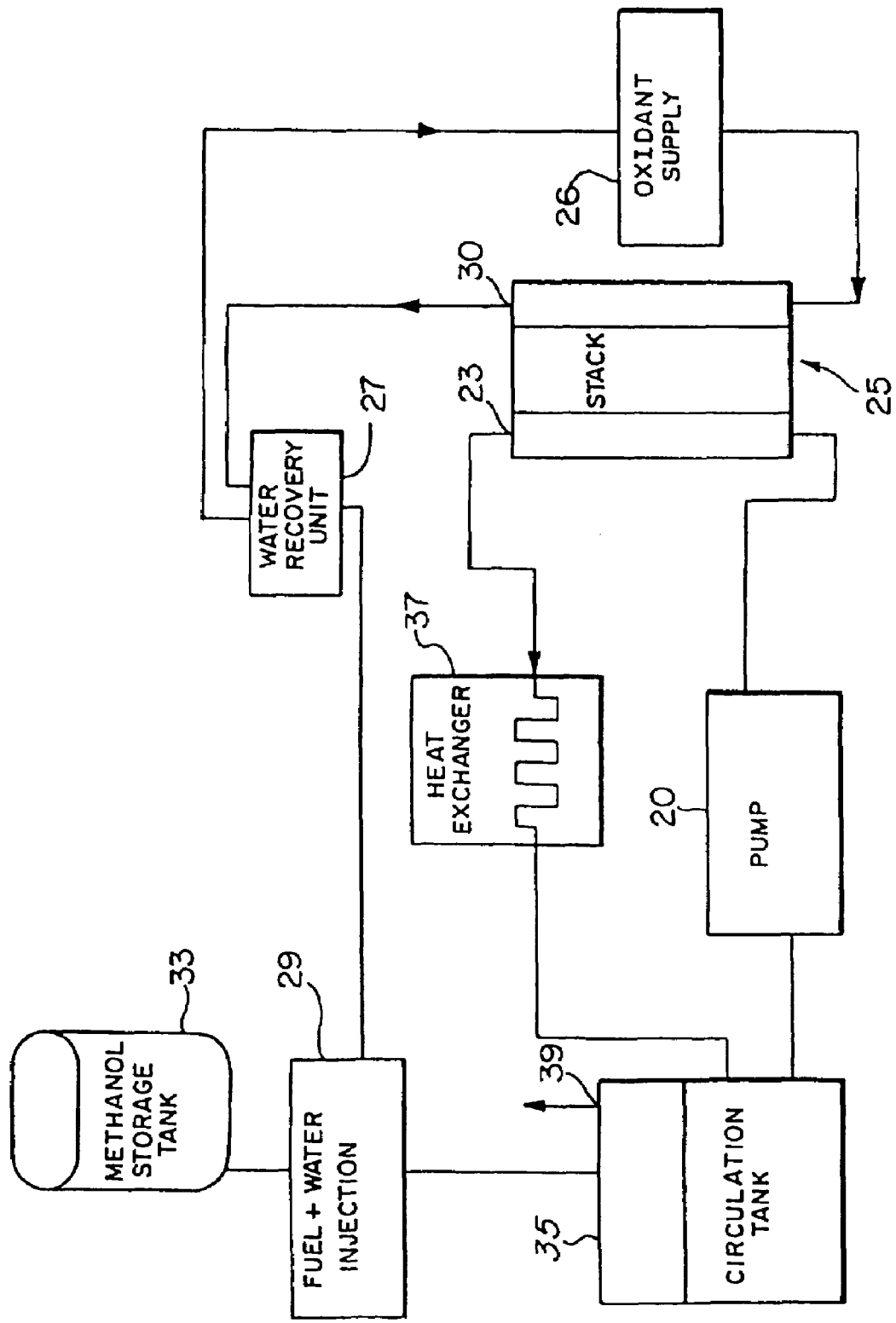
FIG. 2 provides a schematic representation of a multi-cell fuel system employing the improved liquid feed organic fuel cell of FIG. 1.

FIG. 1 illustrates a liquid feed organic fuel cell 10 having a housing 12, an anode 14, a cathode 16 and a solid polymer proton-conducting cation-exchange electrolyte membrane 18. As will be described in more detail below, anode 14, cathode 16 and solid polymer electrolyte membrane 18 are preferably a single multi-layer composite structure, referred to herein as a membrane electrode assembly. A pump 20 is provided for pumping an organic fuel and water solution into an anode chamber 22 of housing 12. The organic fuel and water mixture is withdrawn through an outlet port 23 and is re-circulated through a re-circulation system described below with reference to FIG. 2 which includes a methanol tank 19. Carbon dioxide formed in the anode compartment is vented through a port 24 within tank 19. An oxygen or air compressor 26 is provided to feed oxygen or air into a cathode chamber 28 within housing 12. FIG. 2, described below, illustrates a fuel cell system incorporating a stack of individual fuel cells including the re-circulation system. The following detailed description of the fuel cell of FIG. 1 primarily focuses on the structure and function of anode 14, cathode 16 and membrane 18.

Prior to use, anode chamber 22 is filled with the organic fuel and water mixture and cathode chamber 28 is filled with air or oxygen. During operation, the organic fuel is circulated past anode 14 while oxygen or air is pumped into chamber 28 and circulated past cathode 16. When an electrical load (not shown) is connected between anode 14 and cathode 16, electro-oxidation of the organic fuel occurs at anode 14 and electro-reduction of oxygen occurs at cathode 16. The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

As noted above, anode 14, cathode 16 and membrane 18 form a single composite layered structure. In a preferred implementation, membrane 18 is formed from Nafion™, a perfluorinated proton-exchange membrane material. Nafion™ is a co-polymer of tetrafluoroethylene and perfluorovinylether sulfonic acid. Other membrane materials can also be used. For example, membranes of modified perflourinated sulfonic acid polymer, polyhydrocarbon sulfonic acid and composites of two or more kinds of proton exchange membranes can be used.

Anode 14 is formed from platinum-ruthenium alloy particles either as fine metal powders, i.e. "unsupported", or dispersed on high surface area carbon, i.e. "supported". The high surface area carbon may be a material such as Vulcan XC-72A, provided by Cabot Inc., USA. A carbon fiber sheet backing (not shown) is used to make electrical contact with the particles of the electrocatalyst. Commercially available Toray™ paper is used as the electrode backing sheet. A supported alloy electrocatalyst on a Toray™ paper backing is available from E-Tek, Inc., of Framingham, Mass. Alternately, both unsupported and supported electrocatalysts may be prepared by chemical methods, combined with Teflon™ binder and spread on Toray™ paper backing to produce the anode. An efficient and time-saving method of fabrication of electro-catalytic electrodes is described in detail herein below.

Platinum-based alloys in which a second metal is either tin, iridium, osmium, or rhenium can be used instead of platinum-ruthenium. In general, the choice of the alloy depends on the fuel to be used in the fuel cell. Platinum-ruthenium is preferable for electro-oxidation of methanol. For platinum-ruthenium, the loading of the alloy particles in the electrocatalyst layer is preferably in the range of 0.5-4.0 mg/cm². More efficient electro-oxidation is realized at higher loading levels, rather than lower loading levels.

Cathode 16 is a gas diffusion electrode in which platinum particles are bonded to one side of membrane 18. Cathode 16 is preferably formed from unsupported or supported platinum bonded to a side of membrane 18 opposite to anode 14. Unsupported platinum black (fuel cell grade) available from Johnson Matthey Inc., USA or supported platinum materials available from E-Tek Inc., USA are suitable for the cathode. As with the anode, the cathode metal particles are preferably mounted on a carbon backing material. The loading of the electrocatalyst particles onto the carbon backing is preferably in the range of 0.5-4.0 mg/cm². The electrocatalyst alloy and the carbon fiber backing contain 10-50 weight percent Teflon™ to provide hydrophobicity needed to create a three-phase boundary and to achieve efficient removal of water produced by electro-reduction of oxygen.

During operation, a fuel and water mixture (containing no acidic or alkaline electrolyte) in the concentration range of 0.5-3.0 mole/liter is circulated past anode 14 within anode chamber 22. Preferably, flow rates in the range of 10-500 milliliters/min. are used. As the fuel and water mixture circulates past anode 14, the following electrochemical reaction, for an exemplary methanol cell, occurs releasing electrons:

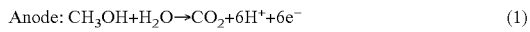

$$\text{Anode: } CH_3OH + H_2O \rightarrow CO_2 + 6H^+ + 6e^- \quad (1)$$

Carbon dioxide produced by the above reaction is withdrawn along with the fuel and water solution through outlet 23 and separated from the solution in a gas-liquid separator (described below with reference to FIG. 2). The fuel and water solution is then re-circulated into the cell by pump 20.

Simultaneous with the electrochemical reaction described in equation 1 above, another electrochemical reaction involving the electro-reduction of oxygen, which captures electrons, occurs at cathode 16 and is given-by:

$$\text{Cathode: } O_2 + 4H^+ + 4e^- \rightarrow H_2O \quad (2)$$

The individual electrode reactions described by equations 1 and 2 result in an overall reaction for the exemplary methanol fuel cell given by:

$$\text{Cell: } CH_3OH + 1.5O_2 \rightarrow CO_2 + 2H_2O \quad (3)$$

At sufficiently high concentrations of fuel, current densities greater than 500 mA/cm can be sustained. However, at these concentrations, a crossover rate of fuel across membrane 18 to cathode 16 increases to the extent that the efficiency and electrical performance of the fuel cell are reduced significantly. Concentrations below 0.5 mole/liter restrict cell operation to current densities less than 100 mA/cm2. Lower flow rates have been found to be applicable at lower current densities. High flow rates are required while operating at high current densities to increase the rate of mass transport of organic fuel to the anode as well as to remove the carbon dioxide produced by electrochemical reaction. Low flow rates also reduce the crossover of the fuel from the anode to the cathode through the membrane.

Preferably, oxygen or air is circulated past cathode 16 at pressures in the range of 10 to 30 psig. Pressures greater than ambient improve the mass transport of oxygen to the sites of electrochemical reactions, especially at high current densities. Water produced by electrochemical reaction at the cathode is transported out of cathode chamber 28 by flow of oxygen through port 30.

In addition to undergoing electro-oxidation at the anode, the liquid fuel which is dissolved in water permeates through solid polymer electrolyte membrane 18 and combines with oxygen on the surface of the cathode electrocatalyst. This process is described by equation 3 for the example of methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimize the rate of fuel crossover. The rate of crossover is proportional to the permeability of the fuel through the solid electrolyte membrane and increases with increasing concentration and temperature. By choosing a solid electrolyte membrane with low water content, the permeability of the membrane to the liquid fuel can be reduced. Reduced permeability for the fuel results in a lower crossover rate. Also, fuels having a large molecular size have a smaller diffusion coefficient than fuels which have small molecular size. Hence, permeability can be reduced by choosing a fuel having a large molecular size. While water soluble fuels are desirable, fuels with moderate solubility exhibit lowered permeability. Fuels with high boiling points do not vaporize and their transport through the membrane is in the liquid phase. Since the permeability for vapors is higher than liquids, fuels with high boiling points generally have a low crossover rate. The concentration of the liquid fuel can also be lowered to reduce the crossover rate. With an optimum distribution of hydrophobic and hydrophilic sites, the anode structure is adequately wetted by the liquid fuel to sustain electrochemical reaction and excessive amounts of fuel are prevented from having access to the membrane electrolyte. Thus, an appropriate choice of anode structures can result in the high performance and desired low crossover rates.

Because of the solid electrolyte membrane is permeable to water at temperatures greater than 60° C., considerable quantities of water are transported across the membrane by permeation and evaporation. The water transported through the membrane is condensed in a water recovery system and fed into a water tank (both described below with reference to FIG. 2) so that the water can be re-introduced into anode chamber 22.

Protons generated at anode 14 and water produced at cathode 16 are transported between the two electrodes by proton-conducting solid electrolyte membrane 18. The maintenance of high proton conductivity of membrane 18 is important to the effective operation of an organic/air fuel cell. The water content of the membrane is maintained by providing contact directly with the liquid fuel and water mixture. The thickness of the proton-conducting solid polymer electrolyte membranes should be in the range from 0.05-0.5 mm to be dimensionally stable. Membranes thinner than 0.05 mm may result in membrane electrode assemblies which are poor in mechanical strength, while membranes thicker than 0.5 mm may suffer extreme and damaging dimensional changes induced by swelling of the polymer by the liquid fuel and water solutions and also exhibit excessive resistance. The ionic conductivity of the membranes should be greater than 1 $ohm^{-1}$ $cm^{-1}$ for the fuel cell to have a tolerable internal resistance. As noted above, the membrane should have a low permeability to the liquid fuel. Although a Nafion™ membrane has been found to be effective as a proton-conducting solid polymer electrolyte membrane, perfluorinated sulfonic acid polymer membranes such as Aciplex™ (manufactured by Asahi Glass Co., Japan) and polymer membranes made by Dow Chemical Co., USA, such as XUS13204.10 which are similar in properties to Nafion™ are also applicable. Membranes of polyethylene and polypropylene sulfonic acid, polystyrene sulfonic acid and other polyhydrocarbon-based sulfonic acids (such as membranes made by RAI Corporation, USA) can also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water contents, or differing types and extents of cross-linking (such as cross linked by multivalent cations e.g., $Al^{3+}$, $Mg^{2+}$ etc.) can be used to achieve low fuel permeability. Such composite membranes can be fabricated to achieve high ionic conductivity, low permeability for the liquid fuel and good electrochemical stability.

As can be appreciated for the foregoing description, a liquid feed direct oxidation organic fuel cell is achieved using a proton-conducting solid polymer membrane as electrolyte without the need for a free soluble acid or base electrolyte. The only electrolyte is the proton-conducting solid polymer membrane. No acid is present in free form in the liquid fuel and water mixture. Since no free acid is present, acid-induced corrosion of cell components, which can occur in current-art acid based organic/air fuel cells, is avoided. This offers considerable flexibility in the choice of materials for the fuel cell and the associated subsystems. Furthermore, unlike fuel cells which contain potassium hydroxide as liquid electrolyte, cell performance does not degrade because soluble carbonates are not formed. Also by the use of a solid electrolyte membrane, parasitic shunt currents are avoided.

Referring now to FIG. 2, a fuel cell system employing a stack of fuel cells similar to the fuel cell shown in FIG. 1 will now be described. The fuel cell system includes a stack 25 of fuel cells, each having the membrane/electrode assembly described above with reference to FIG. 1. Oxygen or air is supplied by an oxidant supply 26 which may be, for example, a bottled oxygen supply, an air-blowing fan or an air compressor. An air and water or oxygen and water mixture is withdrawn from stack 25 through an outlet port 30 and conveyed to a water recovery unit 27. Water recovery unit 27 operates to separate the air or oxygen from the water. A portion of the air or oxygen separated by unit 27 is returned to oxidant supply 26 for re-entry into stack 25. Fresh air or oxygen is added to supply 27. Water separated by unit 27 is fed to a fuel and water injection unit 29 which also receives an organic fuel, such as methanol, from a storage tank 33. Injection unit 29 combines the water from recovery unit 27 with the organic fuel from tank 33, yielding a fuel and water solution with the fuel dissolved in the water.

The fuel and water solution provided by injection unit 29 is fed into a circulation tank 35. A fuel and water mixture containing carbon dioxide is withdrawn through port 23 from stack 25 and is fed through a heat exchanger 37 and into circulation tank 35. Hence circulation tank 35 receives both a fuel and water solution from injection unit 29 and a fuel and water solution containing a carbon dioxide gas from heat exchanger 37. Circulation tank 35 extracts carbon dioxide from the fuel and water mixture and releases the carbon dioxide through a vent 39. The resulting fuel and water solution is fed through pump 20 and into stack 25. Circulation tank 35 can also be located between stack 25 and heat exchanger 34 so as to remove the carbon dioxide before the heat exchanger and thereby improve performance of the heat exchanger.

The operation of the various components illustrated in FIG. 2 will now be described in greater detail. Circulation tank 35 is a tower having a large head space. The liquid fuel and water mixture received from injection unit 29 is added into a top of the tower. The fuel and water mixture having carbon dioxide therein is fed into a bottom portion of the tower. Carbon dioxide gas released from the fuel and water mixture is allowed to accumulate in the head space and is ultimately vented. Alternately, the fuel and water mixture containing the carbon dioxide can be passed through a cluster of tubes of a microporous material such as Celgard™ or GoreTex™ which allows gases to be released through walls of the tubes of the microporous material, while the liquid fuel flows along an axis of the tubes. Celgard™ and GoreTex™ are registered trademarks of Celanese Corp. and Gore Association, USA.

A static re-circulation system (not shown) can be employed within an anode chamber of stack 25 to separate carbon dioxide from the fuel and water mixture such that an external circulation tank need not be provided. With such a system, bubbles of carbon dioxide, due to innate buoyancy, tend to rise vertically within the anode chamber. Viscous interaction with the liquid fuel mixture surrounding the gas bubbles drags the liquid fuel upwards in the direction of outlet port 23. Once outside the anode chamber, the liquid releases the gas, exchanges heat with the surroundings and cools, thereby becoming denser than the liquid in the cell. The denser liquid is fed into the bottom of the anode chamber through an inlet port. Instead of expending electrical energy on the pump, the static re-circulation system takes advantage of the heat and gas produced in the cell. The aforementioned process forms the basis of the static re-circulation system which will not be described in further detail. It should be noted that the use of a static re-circulation system may restrict the orientation at which the fuel cell can be operated and may be viable only for stationary applications.

Test Results for Fuel Cell having a Nafion™ Electrolyte Membrane.

The kinetics of electro-oxidation of methanol for a sulfuric acid electrolyte and Nafion™ electrolyte have been studied by galvanostatic polarization measurements in electrochemical cells (not illustrated but similar to an electro-deposition cell illustrated below in FIG. 10). The cells consist of a working electrode, a platinum counter electrode and a reference electrode. The working electrode is polarized within a solution containing the chosen electrolyte and liquid fuel. The potential of the working electrode versus the reference electrode is monitored.

Figure 3:
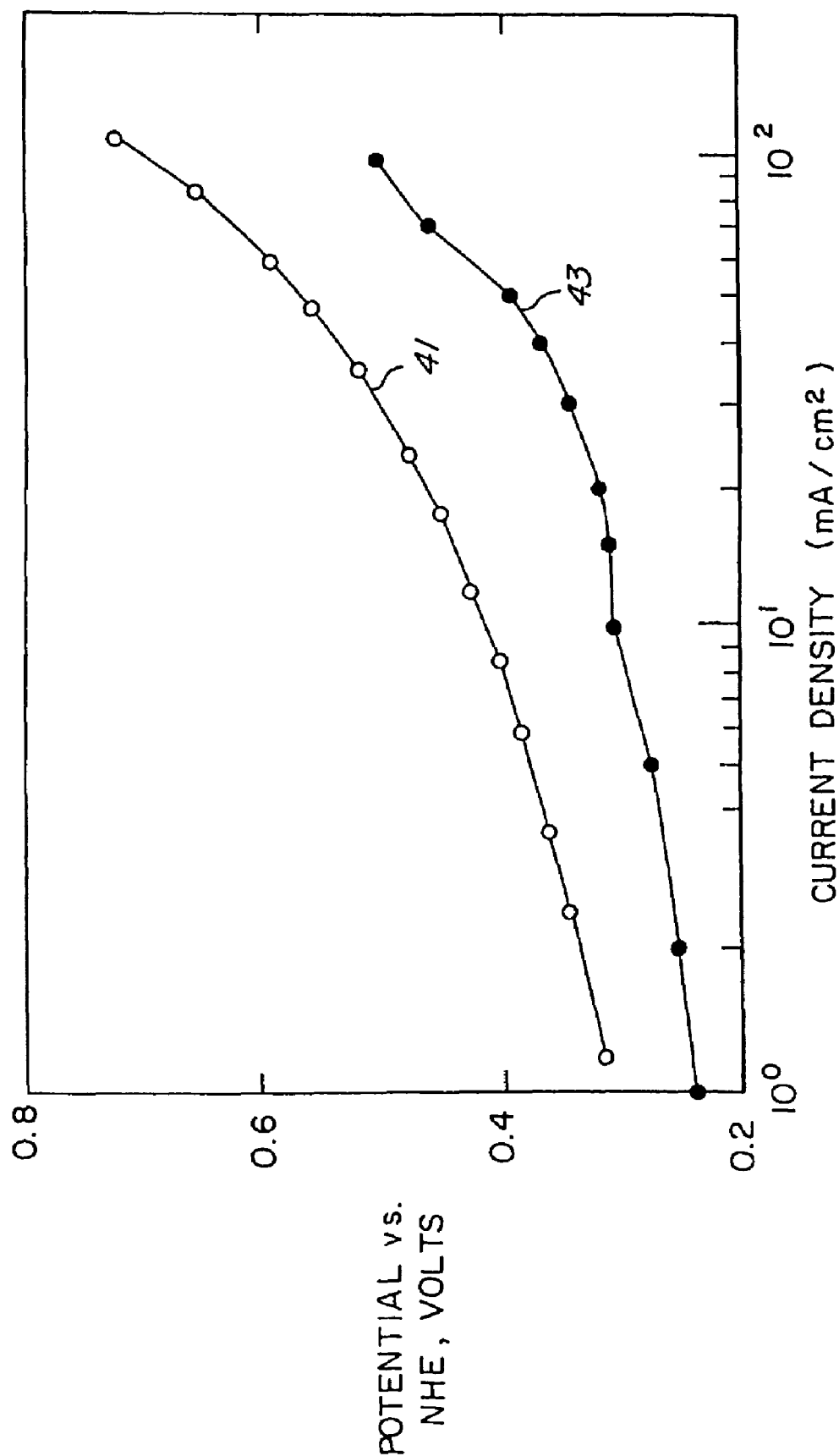
FIG. 3 is a graph illustrating the performance of a solid polymeric membrane electrolyte and a sulfuric acid electrolyte in liquid organic fuels.

FIG. 3 illustrates the polarization curve, i.e. polarization versus current density in milliampers/cm$^2$ (mA/cm$^2$), for the kinetics of methanol oxidation in the Nafion™ and sulfuric acid electrolytes, with curve 41 illustrating polarization for 0.5 M sulfuric acid electrolyte and with curve 43 illustrating polarization for a Nafion™ electrolyte. Polarization is represented in potential versus NHE, wherein NHE stands for normalized hydrogen electrode. The curves represent measured data for a fuel consisting of a 1 M mixture of methanol in water at 60° C. As can be seen from FIG. 3, the polarization losses are lower when the electrode is in contact with Nafion™ rather than sulfuric acid. Hence, it can be concluded that the kinetics of electro-oxidation of methanol are more facile when the electrolyte is Nafion™. These observations may be explained by the fact that strong adsorption of sulfate ions occurs at an electrode/sulfuric acid interface at positive potentials which hinders the kinetics of electro-oxidation. Such adsorption does not occur when Nafion™ is employed as an electrolyte since no such ions are produced. Also, it is believed that the kinetics of electro-reduction of oxygen or air are enhanced at an electrode/Nafion™ interface, in comparison to an electrode/sulfuric acid interface. This later effect may be due to the higher solubility of oxygen in Nafion™ and the absence of strongly adsorbed anions. Therefore, the use of the proton-conducting solid polymer membrane as electrolyte is beneficial to the kinetics of both of the electrode reactions and overcomes the disadvantages of a sulfuric acid electrolyte.

Also, sulfuric acid electrolytes suffer degradation at temperatures greater than 80° C. Products of degradation can reduce the performance of the individual electrodes. The electrochemical stability and thermal stability of a solid polymer electrolyte such as Nafion™ is considerably higher than that of sulfuric acid and the solid polymer electrolyte can be used at temperatures as high as 120° C. Therefore the use of the proton-conducting solid polymer membrane permits long term fuel cell operation at temperatures as high as 120° C., which provides an additional advantage since the kinetics of electro-oxidation of fuels and electro-reduction of oxygen occur with greater facility as the temperature is increased.

Figure 4:
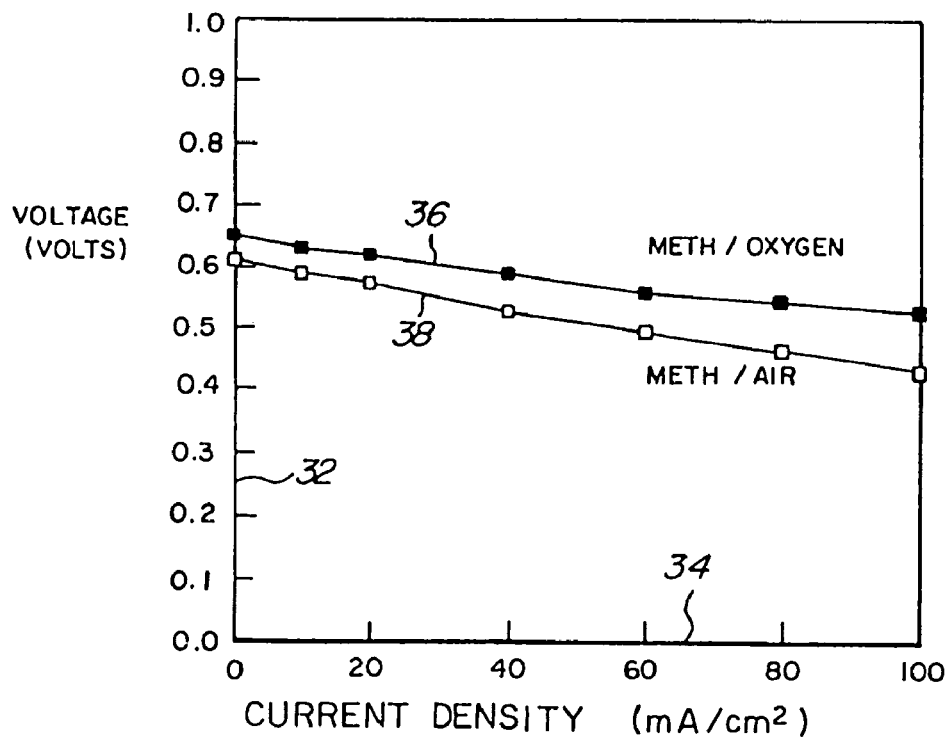
FIG. 4 is a graph illustrating the performance of liquid feed fuel cell of FIG. 1 for methanol/air and methanol/oxygen combinations.

FIG. 4 illustrates the performance of the fuel cell shown in FIG. 2 when operated at 65° C. for both a methanol oxygen combination and a methanol/air combination. In FIG. 4, voltage of the fuel cell is illustrated along axis 32 and current density in mA/cm$^2$ is illustrated along axis 34. Curve 36 indicates performance of the methanol/oxygen combination while curve 38 illustrates performance of the methanol/air combination. As can be seen, the use of pure oxygen provides slightly better performance than air.

Figure 5:
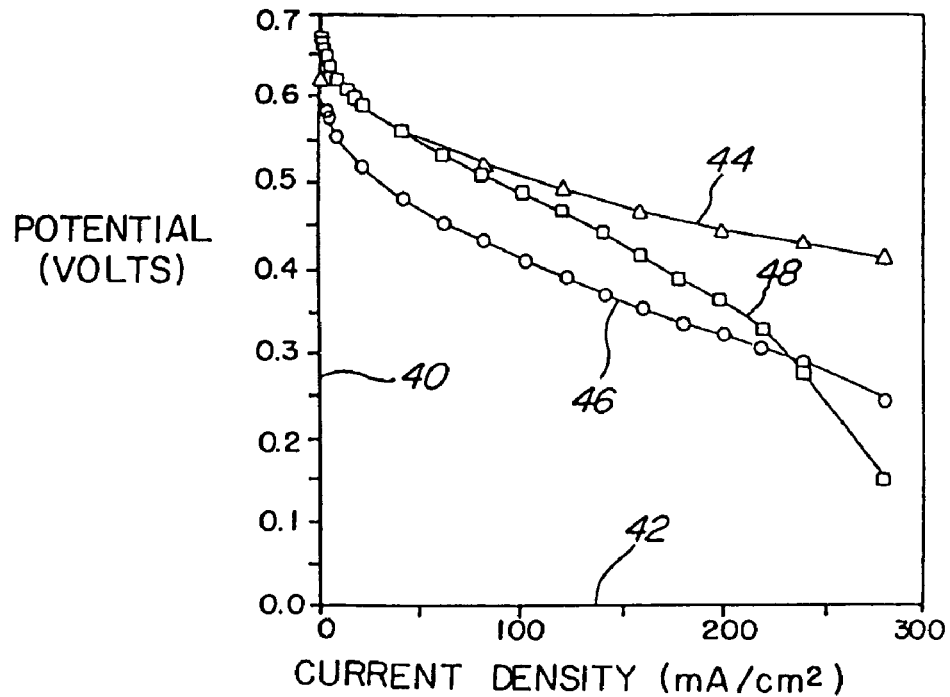
FIG. 5 is a graph illustrating the effect of fuel concentration on the performance of the liquid feed fuel cell of FIG. 1.

FIG. 5 illustrates the effect of fuel concentration on cell performance. Fuel cell potential is illustrated along axis 40 while current density in MA/cm$^2$ is illustrated along axis 42. Curve 44 indicates performance for a 2.0 molar methanol solution at 150 degrees Fahrenheit (F). Curve 46 illustrates performance for a 0.5 molar methanol mixture at 140 degrees F. Curve 48 illustrates performance for a 4.0 M methanol mixture at 160 degrees F. As can be seen, the 2.0 M methanol mixture provides the best overall performance. Also, FIG. 5 illustrates that the fuel cell can sustain current densities as high as 300 mA/cm$^2$ while maintaining reasonably high voltage. In particular, the 2.0 molar methanol mixture provides a voltage of over 0.4 volts at nearly 300 mA/cm$^2$. The performance illustrated in FIG. 5 represents a significant improvement over the performance of previous organic fuel cells.

Figure 6:
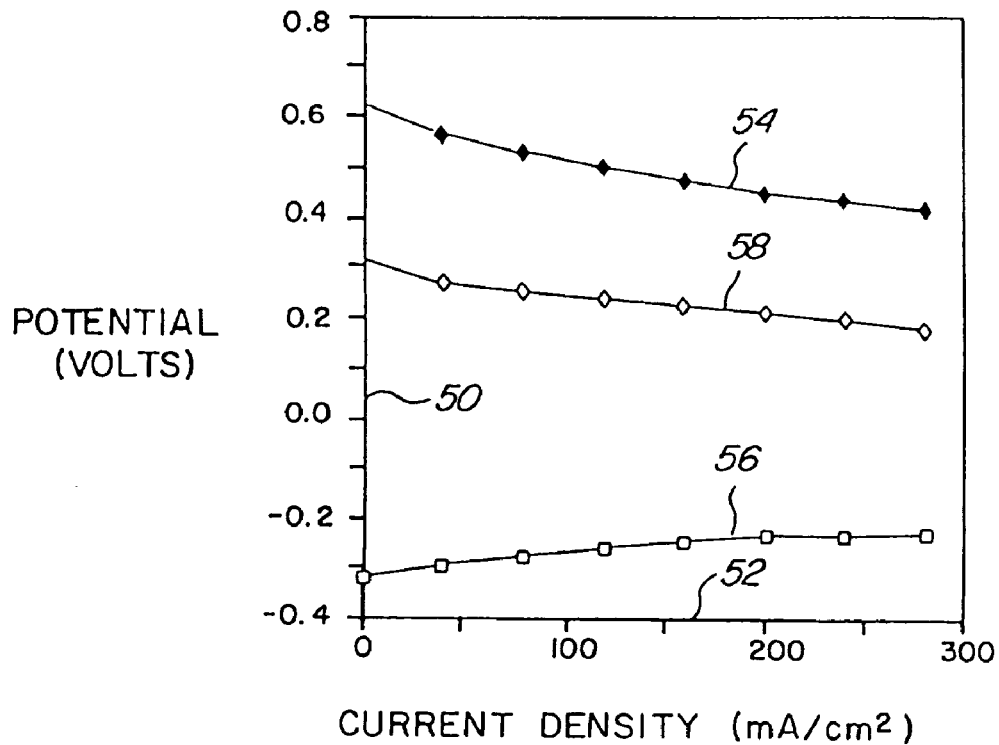
FIG. 6 is a graph illustrating the polarization behavior of the fuel electrode and cathode in the fuel cell of FIG. 1.

Polarization behavior of the anode and cathode of the fuel cell are illustrated in FIG. 6 as a function of current density in mA/cm$^2$, with voltage shown along axis 50 and current density along axis 52. Curve 54 illustrates polarization behavior for a 2.0 molar mixture at 150 degrees F. Curve 56 illustrates the polarization behavior for the fuel while curve 58 separately illustrates polarization behavior for the oxygen.

Anode Structures for Liquid Feed Fuel Cells.

The anode structure for liquid feed fuel cells must be quite different from that of conventional fuel cells. Conventional fuel cells employ gas diffusion type electrode structures that can provide gas, liquid and solid equilibrium. However, liquid feed type fuel cells require anode structures that are similar to batteries. The anode structures must be porous and must be capable of wetting the liquid fuel. In addition, the structures must have both electronic and ionic conductivity to effectively transport electrons to the anode current collector (carbon paper) and hydrogen/hydronium ions to the Nafion™ electrolyte membrane. Furthermore, the anode structure must help achieve favorable gas evolving characteristics at the anode.

Electrodes required for liquid feed type fuel cells can be fabricated specifically or conventional gas diffusion electrodes available commercially can be modified with suitable additives.

Electrode Impregnation with Ionomeric Additive.

The electrocatalyst layer and carbon fiber support of anode 14 (FIG. 1) are preferably impregnated with a hydrophilic proton-conducting polymer additive such as Nafion™. The additive is provided within the anode, in part, to permit efficient transport of protons and hydronium produced by the electro-oxidation reaction. The ionomeric additive also promotes uniform wetting of the electrode pores by the liquid fuel/water solution and provides for better utilization of the electrocatalyst. The kinetics of methanol electro-oxidation by reduced adsorption of anions is also improved. Furthermore, the use of the ionomeric additive helps achieve favorable gas evolving characteristics for the anode.

For an anode additive to be effective, the additive should be hydrophilic, proton-conducting, electrochemically stable and should not hinder the kinetics of oxidation of liquid fuel. Nafion™ satisfies these criteria and is a preferred anode additive. Other hydrophilic proton-conducting additives which are expected to have the same effect as Nafion™ are montmorrolinite clays, zeolites, alkoxycelluloses, cyclodextrins, and zirconium hydrogen phosphate.

FIG. 7 is a block diagram which illustrates the steps involved in impregnation of the anode with an ionomeric additive such as Nafion™. Initially, a carbon electrode structure is obtained or prepared. Commercially available high surface area carbon electrode structures which employ a mixture of high surface area electrocatalyst and Teflon™ binder applied on Toray™ carbon fiber paper may be used. An electro-catalytic electrode may also be prepared from high surface area catalyst particles and Toray™ paper, both available from E-Tek, Inc., using TFE-30™, an emulsion of polytetrafluoroethylene. Although these structures can be prepared from the foregoing component materials, prefabricated structures may also be obtained directly from E-Tek in any desired dimension.

At step 302, the electrodes are impregnated with an ionomeric additive, such as Nafion™, by immersing the electrocatalyst particles in a solution containing 0.5-5% of the ionomeric additive (by appropriate dilution, with methanol or isopropanol, of solutions supplied by Aldrich Chemical Co., or Solution Technologies Inc.) for 5-10 minutes. The electrode is then removed, at step 304, from the solution and dried in air or vacuum at temperatures ranging from 20-60° C. to volatilize any higher alcohol residues associated with the Nafion™ solution. The impregnation steps 302-304 are repeated until the desired composition (which is in the range of 2-10% of the weight of the electrocatalyst) is achieved. A loading of 0-1 to 0.5 mg/cm$^2$ is exemplary. Electrode compositions with additive in excess of 10% may result in an increased internal resistance of the fuel cell and poor bonding with the solid polymer electrolyte membrane. Compositions with less than 2% of the additives do not typically result in improved electrode performance.

To form impregnated electrodes from electrocatalyst particles, the electrocatalyst particles are mixed in with a solution of Nafion™ diluted to 1% with isopropanol. Then the solvent is allowed to evaporate until a thick mix is reached. The thick mix is then applied onto a Toray™ paper to form a thin layer of the electrocatalyst. A mixture of about 200 meter$^2$/gram high surface area particles applied to the Toray™ paper is exemplary. Note here that the electrocatalyst layer so formed has only Nafion™ and no Teflon™. Electrodes so prepared are then dried in a vacuum at 60° C. for 1 hour to remove higher alcohol residues, after which they are ready for use in liquid feed cells.

Figure 8:
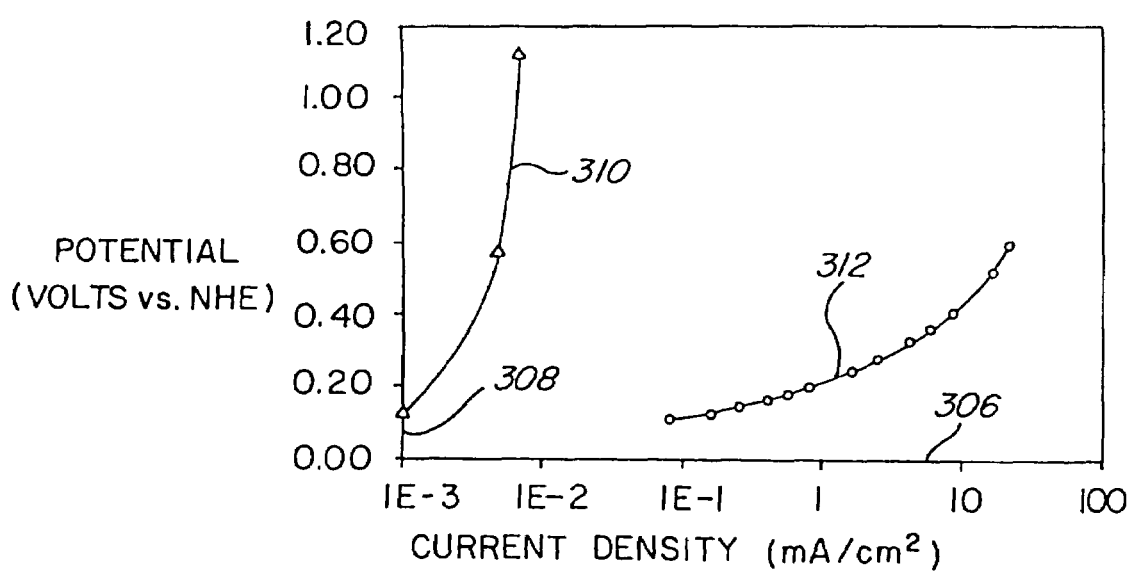
FIG. 8 is a graph illustrating the polarization characteristics for methanol oxidation at electrodes containing the ionomer additive and prepared in accordance with the procedure shown in FIG. 7.

A commercially available high-surface area platinum-tin electrode was impregnated with Nafion™ according to the procedure described above. FIG. 8 compares the performance of a Nafion™ impregnated electrode with a non-impregnated electrode as measured within a half cell similar to the cell of FIG. 10 (below) but containing a sulfuric acid electrolyte. In particular, FIG. 8 illustrates the polarization measurements in liquid formaldehyde fuel (1 molar) with sulfuric acid electrolyte (0.5 molar). The current density in mA/cm$^2$ is illustrated along axis 306 and the potential in volts along axis 308. Curve 310 is the galvanostatic polarization curve for a platinum-tin electrode that does not include Nafion™. Curve 312 is the galvanostatic polarization curve for a platinum-tin electrode not impregnated with Nafion™.

It can be seen from FIG. 8 that far greater current densities are achieved with the Nafion™-impregnated electrode than with the non-impregnated electrode. Indeed with the non-impregnated electrode, very little oxidation of formaldehyde occurs. The addition of Nafion™ thus provides a dramatic improvement. In addition, the absence of any hysteresis in the galvanostatic polarization curves suggest that these coatings are stable.

What has been described thus far is an improved liquid feed fuel cell anode impregnated with an ionomeric additive. A method for fabricating the anode to include the ionomeric additive has also been described. The remaining sections of the Detailed Description provide a description of the use of perfluorooctanesulfonic acid as an additive within an electrodeposition bath used for fabricating electrodes and as a direct additive within a fuel. New fuels are also described.

Electro-Deposition of Electrodes Using Perfluorooctanesulfonic Acid Additive.

Figure 11:
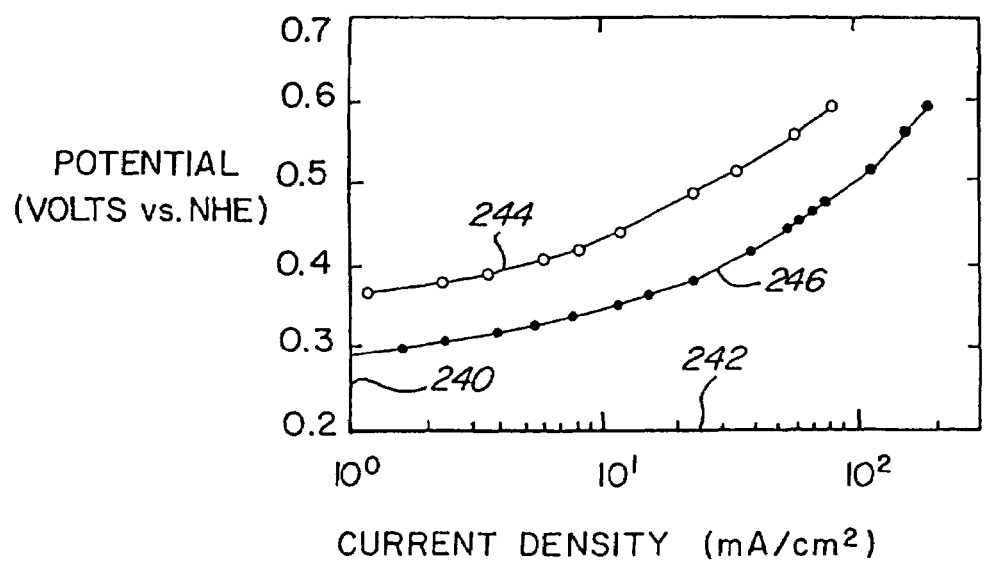
FIG. 11 is a illustrating polarization curves for an electrode fabricating using the method of FIG. 9.
Figure 9:
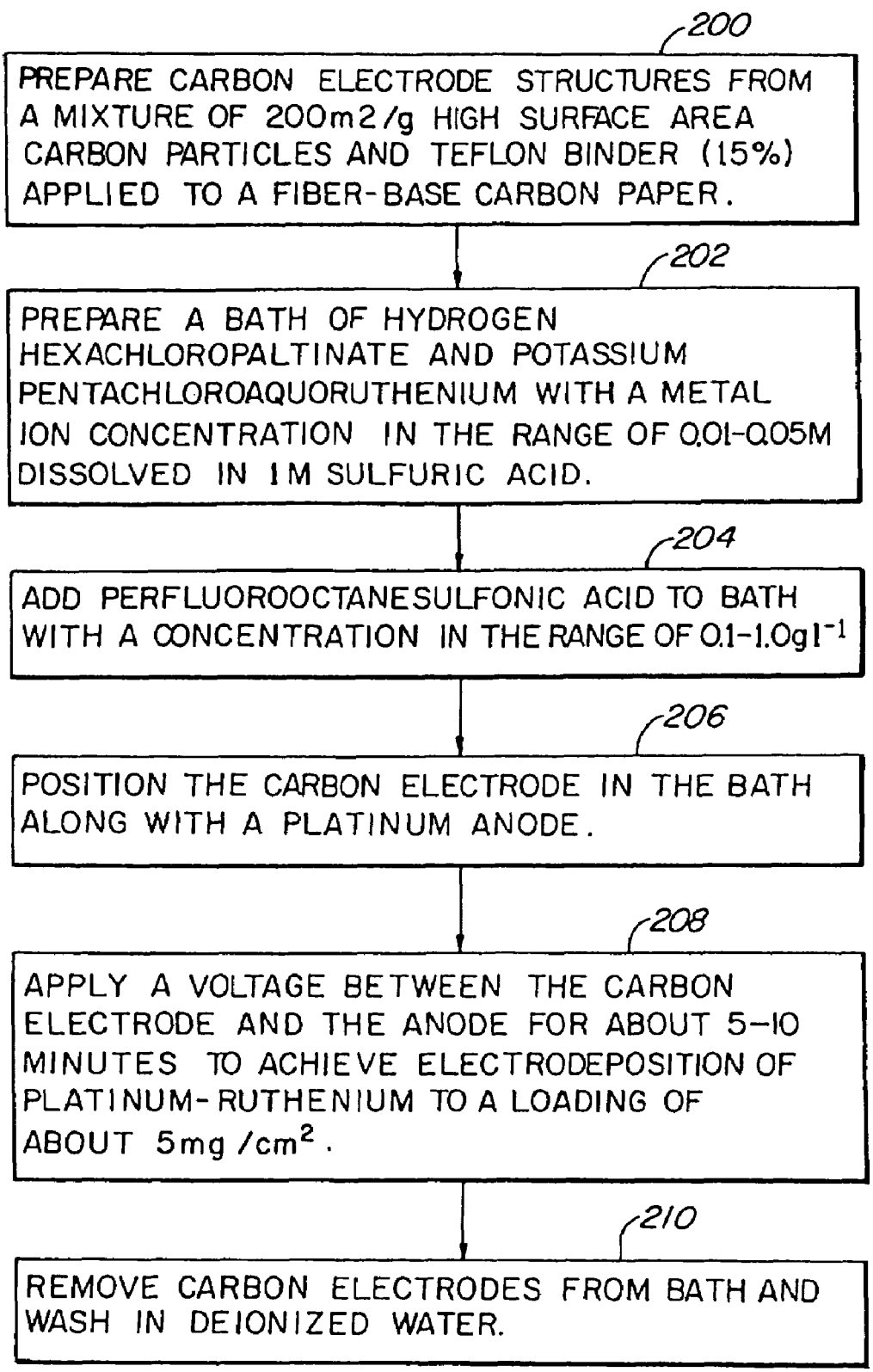
FIG. 9 is a block diagram illustrating a method for fabricating an electrode employing perfluorooctanesulfonic acid within an electro-deposition bath.
Figure 10:
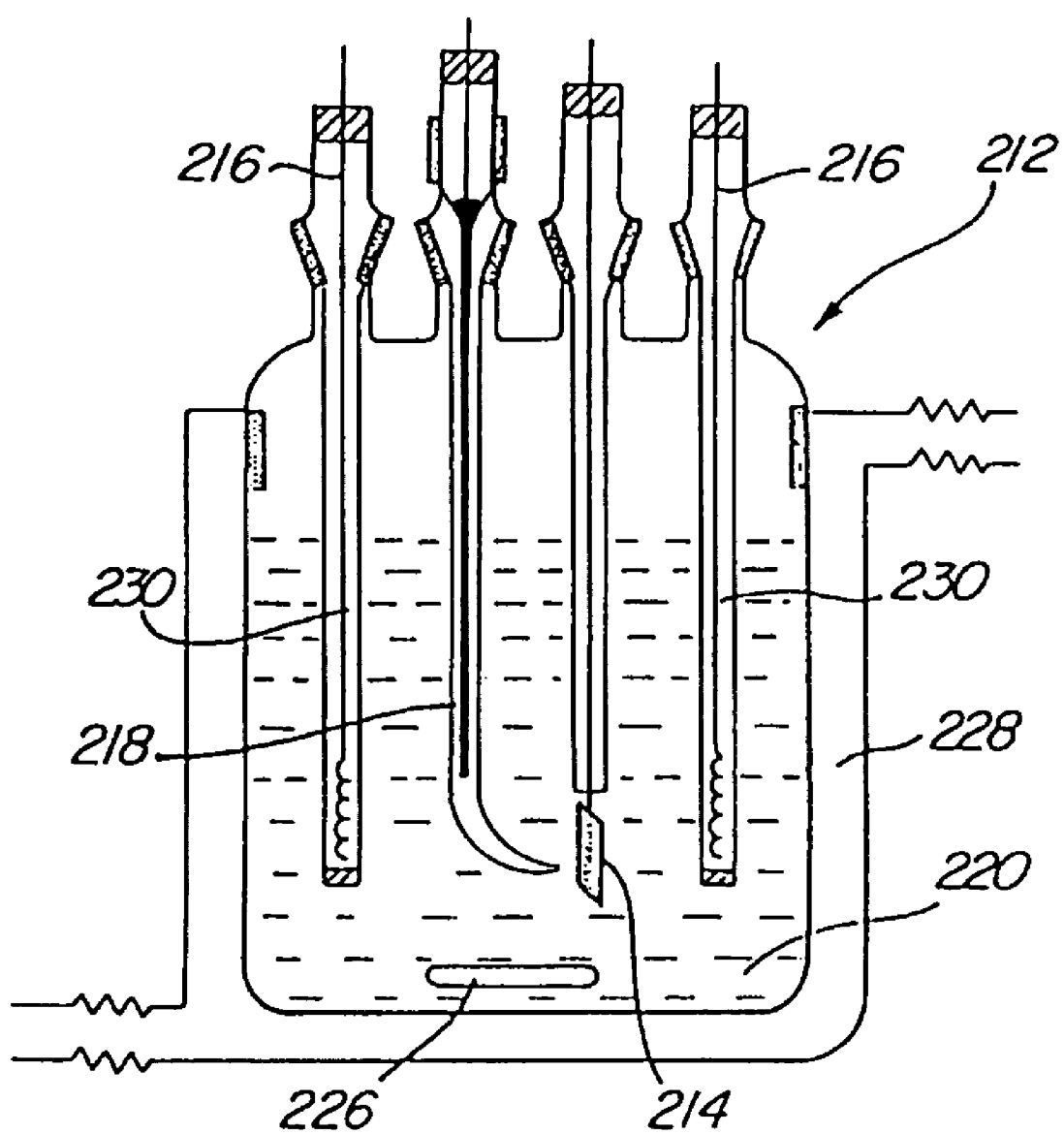
FIG. 10 is a schematic illustration of an electrochemical cell for use in performing the method of FIG. 9.

With reference to FIGS. 9-11, a method for fabricating an electrode for use in a organic fuel cell will now be described in detail. The method is advantageously employed for fabricating a cathode for use in the liquid organic fuel cell described above. However, electrodes prepared by the method of FIGS. 9-11 may alternatively be used in a variety of organic fuel cells.

Referring first to FIG. 9, the steps of a method for fabricating the anode will now be described. Initially, at 200, a carbon electrode structure is prepared by applying a mixture of high-surface-area carbon particles and a Teflon™ binder to a fiber-based carbon paper. Preferably, the carbon particles have a surface area of 200 meters$^2$/gram (m$^2$/g). A suitable carbon particle substrate, referred to Vulcan XC-72, is available from E-Tek Inc. The Teflon™ binder is preferably added to achieve a percentage, by weight, of 15%. The fiber based carbon paper is preferably Toray™ paper, also available from E-Tek Incorporated. The carbon structure may be prepared from the forgoing component materials. Alternatively, commercial prefabricated structures are available in 2 inch by 2 inch squares directly from E-Tek Inc.

At Step 202, an electro-deposition bath is prepared by dissolving hydrogen hexachloropaltinate(IV) and potassium pentachloroaquoruthenium(III) within sulfuric acid. Preferably, the resulting metal-ion-concentration is within the range of 0.01-0.05 M. Also, preferably, the sulfuric acid has the concentration of 1 M. The forgoing compound is employed for obtaining platinum-ruthenium deposits on the carbon electrode structure. Alternative solutions may be employed. For example, to obtain platinum-tin deposits, a stannic chloride compound is dissolved in a sulfuric acid instead.

The metallic ion salts are dissolved in the sulfuric acid primarily to prevent hydrolysis of the solution. For ruthenium deposition, the resulting solution is preferably de-aerated to prevent the formation of higher oxidation states.

High purity perfluoroctanesulfonic acid (C-8 acid) is added to the bath at step 204. C-8 acid is preferably added to a concentration in a range of 0.1-1.0 grams/liters. C-8 acid is provided to facilitate complete wetting of the carbon particles. C-8 acid is electro-inactive and does not specifically adsorb at metal sites within the structure. Therefore, C-8 acid is innocuous to subsequent electro-deposition processes. The addition of C-8 acid has been found to be highly beneficial, and perhaps necessary for successful electro-deposition onto the electrodes.

At 206, the carbon electrode structure resulting from step 200 is placed within the electro-deposition bath resulting from step 204. A platinum anode is also positioned within the bath. For the deposition of other metal ions, an alternate anode material may be employed.

A voltage is then applied between the carbon electrode structure and the platinum anode at step 208. The voltage is applied for about 5 to 10 minutes to achieve electro-deposition of platinum-ruthenium onto the carbon electrode to a loading of about 5 mg/cm². Preferably, a voltage of approximately −0.8V vs mercury sulfate reference electrode is applied.

After a desired amount of metal is deposited onto the carbon electrode, the electrode is removed, at step 210, and washed in deionized water. Preferably, the electrode is washed at least three times in circulating de-ionized water for 15 minutes each time. The washing step is provided primarily to rid the surface of the carbon electrode of absorbed chloride and sulfate ions. The washing step has been found to be highly desirable, and perhaps necessary, for yielding an effective electrode for use in an organic fuel cell.

Electrodes, resulting from the fabrication method of step 206, have been found to have very uniform "cotton-ball"-shaped particles, with a significant amount of fine structure. Average particle size has-been found to be on the order of 0.1 microns.

A deposition setup for use in implementing the method of FIG. 9 is illustrated in FIG. 10. Specifically, FIG. 10 illustrates a three-electrode cell 212 which includes a single carbon-structure electrode 214, a pair of platinum counter-electrodes (or anodes) 216 and a reference electrode 218. All electrodes are positioned within a bath 220 formed of the aforementioned metallic/C-8 acid solution. Electrical contacts 222 and 224 are positioned on interior side surfaces of cell 212 above bath 220. A magnetic stirrer 226 is positioned within bath 220 to facilitate stirring the bath.

Adequate electro-deposition typically occurs within a period of five to ten minutes, depending upon the operating conditions and the catalyst loading desired.

The monitoring equipment for use in monitoring and controlling the electrode potential are not illustrated in FIG. 10 as the function and operation of such devices are well known to those skilled in the art.

FIG. 11 illustrates the performance of an exemplary electrode deposited using the method of FIG. 9 within the electrodeposition cell of FIG. 7. In FIG. 11, potential in volts versus NHE is provided along axis 240 whereas current density in mA/cm² is provided along axis 242. Curve 246 illustrates the galvanostatic polarization curve for a carbon-supported platinum-ruthenium alloy electrode prepared in accordance with the forgoing for a loading of 5 mg/cm². Curve 246 illustrates galvanostatic polarization for an electrode having a 1 mg/cm² loading. In each case, the electrode was employed within a sulfuric acid electrolye in a half-cell. The fuel cell included an organic fuel composed of 1 molar methanol and 0.5 molar sulfuric acid, operated at 60° C. At the loading of 5 mg/cm², the electrode sustains a continuous current density of 100 mA/cm² at 0.45 volts versus NHE.

The results illustrated in FIG. 11 are exemplary of performance which may be achieved using an electrode fabricated in accordance with the method of FIG. 9. Further performance enhancement may be achieved with appropriate optimization of the electro-deposition conditions and the alloy composition. Hence, the particular conditions and concentrations described above are not necessarily optimal but merely represent a currently known best mode for fabricating electrodes.

Perfluoroctanesulfonic Acid (C-8 Acid) as a Fuel Additive.

The use of C-8 acid as an additive within an electro-deposition bath was described above. It has also been determined that C-8 acid may be advantageously applied as an additive within the fuel of a liquid feed fuel cell employing a sulfuric acid electrolyte. In particular, it has been found that straight chain C-8 acid, having the molecular formula $C_8F_{17}SO_3H$, in concentrations from 0.001 to 0.1 M is an excellent wetting agent within a liquid feed fuel cell.

Figure 12:
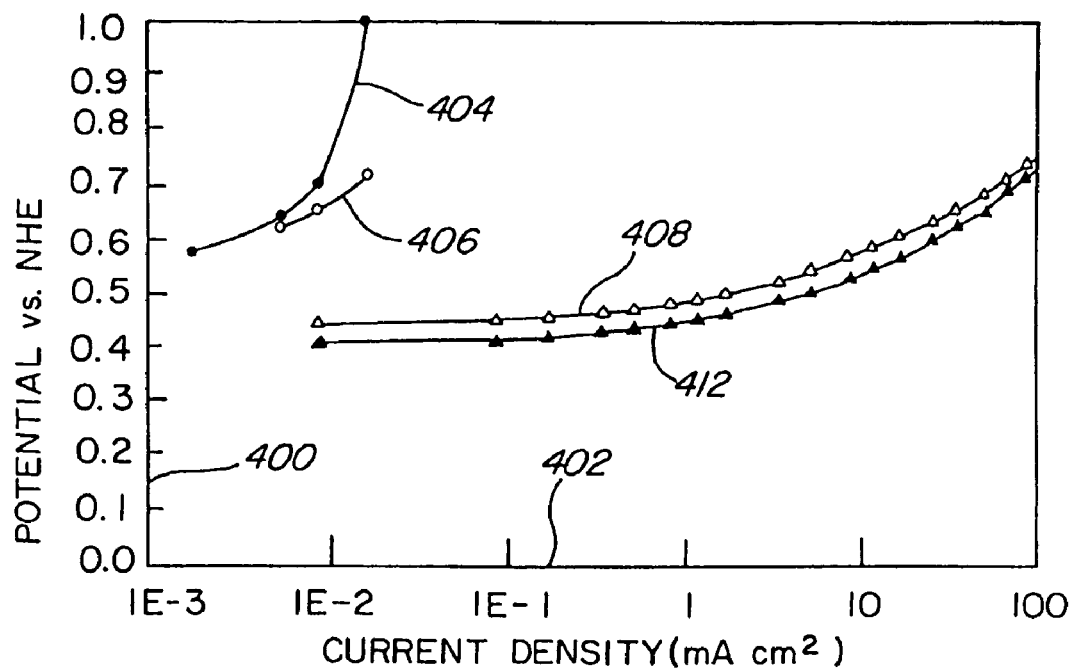
FIG. 12 is a graph illustrating polarization curves of a fuel cell using a sulfuric acid electrolyte and employing perfluorooctanesulfonic acid as a fuel additive.

FIG. 12 illustrates results of experiments which contrast the use of C-8 acid as an additive with fuel cells lacking the additive. In particular, FIG. 12 illustrates the results of half-cell experiments using a Teflon™ coated high-surface area carbon-supported platinum and platinum alloy electrode mounted within a sulfuric acid electrolyte. The results wee obtained using a half-cell similar to the cell illustrated in FIG. 10. FIG. 12 illustrates potential versus NHE along the vertical axis 400 and current density in MA/cm² along a horizontal axis 402. Four curves are provided illustrating polarization for a fuel containing no additive (curve 404), 0.0001 M additive (curve 406), 0.001 M additive (curve 408) and 0.01 M additive (curve 412).

As can be seen from FIG. 12, the addition of the C-8 additive decreases the polarization rather significantly. Although not shown, the oxidation of methanol has also been investigated using 0.1 M pure C-8 acid solutions without any sulfuric acid. Polarization curves (not shown) indicate that the kinetics are not effected by the presence of the perfluorooctanesulfonic ion.

Thus, FIG. 12 demonstrates that the use of C8 acid as an additive in the concentration range 0-001 M or greater is beneficial to liquid fuel solutions when employing commercially available Teflon™ coated fuel cell electrodes, at least for fuel cells employing sulfuric acid ask electrolyte.

With reference to the remaining figures, three new fuels for use in liquid feed fuel cells are described. The fuels are dimethoxymethane, trimethoxymethane, and trioxane.

Dimethoxymethane as a Fuel for a Liquid Feed Fuel Cell.

Figure 13:
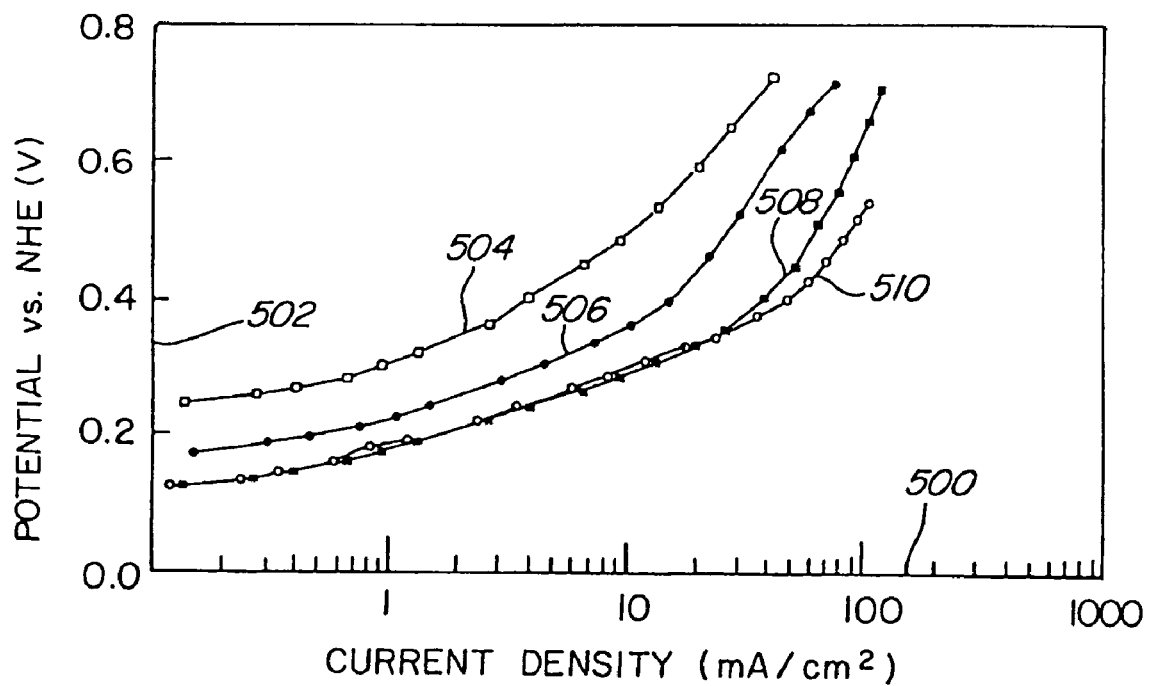
FIG. 13 is a graph illustrating polarization curves of a fuel cell using dimethoxymethane as a fuel for various fuel concentration levels within a half cell having a sulfuric acid electrolyte.
Figure 14:
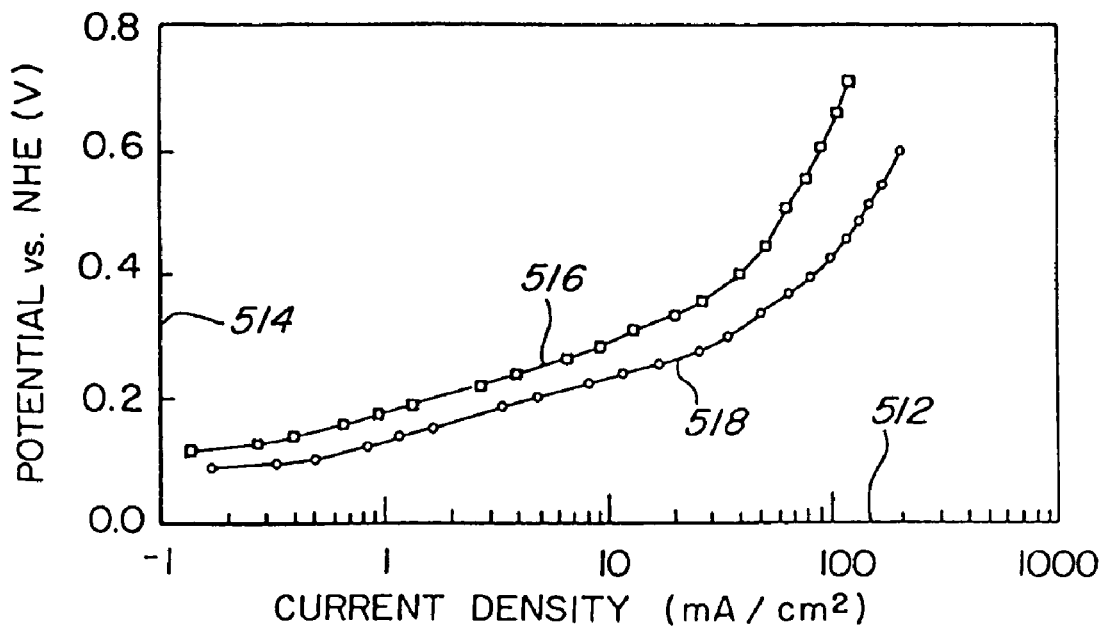
FIG. 14 is a graph illustrating polarization curves of a fuel cell using dimethoxymethane as a fuel for differing temperatures and concentrations within a half cell having a sulfuric acid electrolyte.
Figure 15:
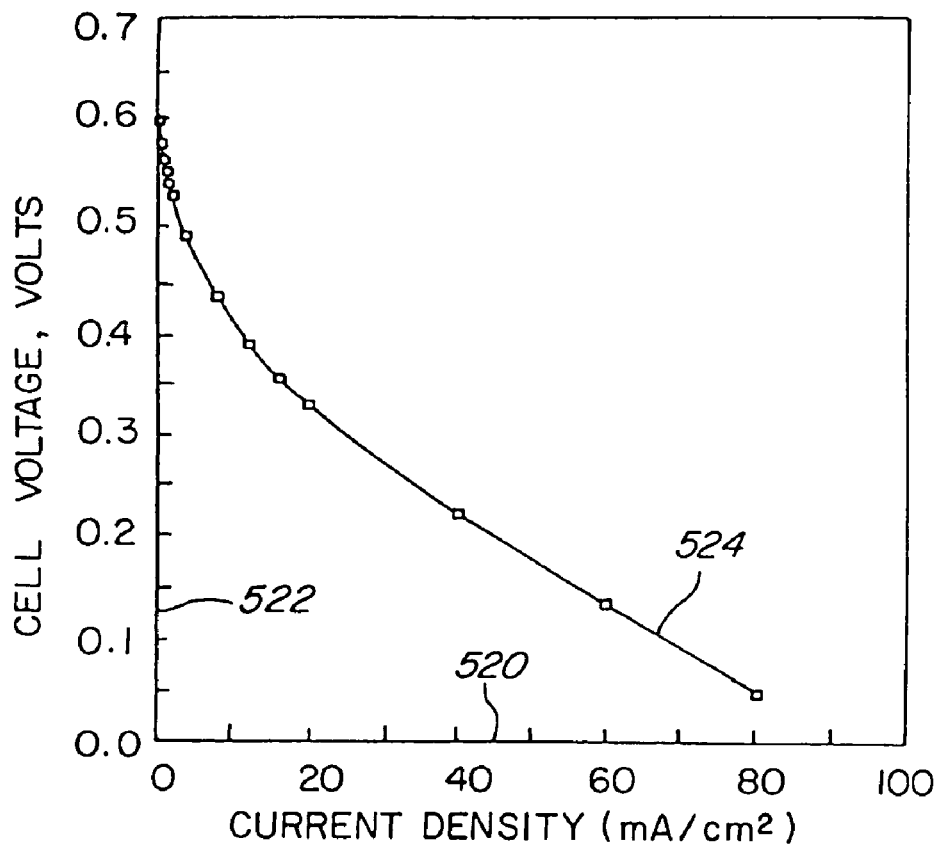
FIG. 15 is a graph illustrating cell voltage as a function of current density for the fuel cell of FIG. 1 using dimethoxymethane as a fuel.

FIGS. 13-15 illustrate the results of experiments conducted using dimethoxymethane (DMM) as a fuel for an organic direct liquid feed fuel cell. In use, DMM is mixed with water to a concentration in the range of about 0.1 to 2 M and fed into a fuel cell. Other concentrations may also be effective. The fuel cell may be of conventional design or may include one or more of the improvements described above. Within the fuel cell, the DMM is electro-oxidized at the anode of the cell. The electro-oxidation of DMM involves a series of dissociative steps followed by surface reaction to form carbon dioxide and water. The electrochemical reaction is given by:

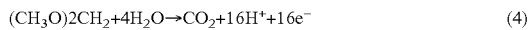

$$(CH_3O)2CH_2 + 4H_2O \rightarrow CO_2 + 16H^+ + 16e^- \qquad (4)$$

Experiments testing the electro-oxidation of DMM have been performed in half cells of the similar to the cell shown in FIG. 10 with temperature control using a 0.5 M sulfuric acid electrolyte with Pt—Sn or Pt—Ru electrocatalyst electrodes. The galvanostatic polarization curves shown in FIG. 13 illustrate the electro-oxidation characteristics of DMM for platinum-tin electrodes for several different fuel concentrations. The platinum-tin electrodes are of the gas-diffusion type consisting of 0.5 mg/cm² total metal supported on Vulcan XC-72 obtained from Etek, Inc., Framingham, Mass. In FIG. 13, current density is illustrated along axis 500 and polarization (in terms of potential versus NHE) is provided along axis 502. Curves 504, 506, 508 and 510, respectively, illustrate polarization for DMM concentrations of 0, 1 M, 0.5 M, 1 M and 2 M. FIG. 13 shows that increased concentration improves the kinetics of oxidation of DMM. The curves of FIG. 13 were measured in a half cell employing 0.5 M sulfuric acid as an electrolyte, along with 0.1 M C-8 acid. The measurements were conducted at room temperature.

It has been found that DMM can be oxidized at potentials considerably more negative than methanol. Also, temperature has been found to significantly influence the rates of oxidation. However, DMM has a low boiling point of 41° C. Hence, difficulties may arise in attempting to use DMM in a liquid feed fuel cell for temperatures higher than the boiling point.

FIG. 14 illustrates polarization for two different concentrations at two different temperatures. Current density is provided along axis 512 and polarization (in terms of potential v. NHE) is provided along axis 514. Curve 516 illustrates polarization for a 1 M concentration of DMM at room temperature. Curve 18 illustrates polarization for a 2 M concentration of DMM at 55° C. As can be seen, improved polarization is achieved using a higher concentration at a higher temperature. Also, a comparison of curve 510 of FIG. 13 with curve 518 of FIG. 14 illustrates that an increase in temperature yields an improved polarization for the same concentration level. Hence, it is believed that an increase in temperature results in improved kinetics of electro-oxidation.

In addition to the half cell experiments illustrated in FIGS. 13 and 14, fuel cell experiments were also conducted to verify the effectiveness of DMM in a fuel cell. The direct oxidation of DMM in fuel cells was carried out in a liquid feed type fuel cell as illustrated above in FIGS. 1 and 2. Hence, the fuel cell employed a proton conducting solid polymer membrane (Nafion™ 117) as the electrolyte. The membrane electrode assembly consisted of a fuel oxidation electrode made of unsupported platinum-ruthenium catalyst layer (4 mg/cm$^2$) and gas-diffusion type unsupported platinum electrode (4 mg/cm$^2$) for the reduction of oxygen. The fuel cell used a 1 M solution of DMM on the fuel oxidation side and oxygen at 20 psi on the cathode.

Analysis of the oxidation products of DMM show only methanol. Methanol is considered a possible intermediate in the oxidation of DMM to carbon dioxide and water. However, since the fuel cell system is compatible with methanol, the presence of methanol as an intermediate is not a concern since the methanol is also ultimately oxidized to carbon dioxide and water.

The current-voltage characteristics of a liquid feed direct oxidation fuel cell using DMM as a fuel is shown in FIG. 15. The fuel cell was operated at 37° C. In FIG. 15, current density in MA/cm$^2$ is provided along axis 520. Cell voltage in volts is provided along axis 522. Curve 524 illustrates cell voltage as a function of current density for a 1 M DMM solution described above. As can be seen from FIG. 15, the cell voltages reached 0.25 V at 50 mA/cm$^2$ with DMM which is as high as that attained with methanol (not shown). By working at a higher-temperature and using a Pt-Sn catalyst, even better performance may be achieved. The low boiling point of DMM also makes it a candidate for a gas-feed type operation.

Thus from these half-cell and full-cell measurements it has been found that DMM is capable of being oxidized at very high rates. Therefore, it is believed that DMM is an excellent fuel for use in direct oxidation fuel cells. Also, DMM is a non-toxic, low-vapor pressure liquid, permitting easy handling. In addition DMM can be synthesized from natural gas (methane) by conventional techniques.

Trimethoymethane as a Fuel for a Liquid Feed Fuel Cell.

Figure 16:
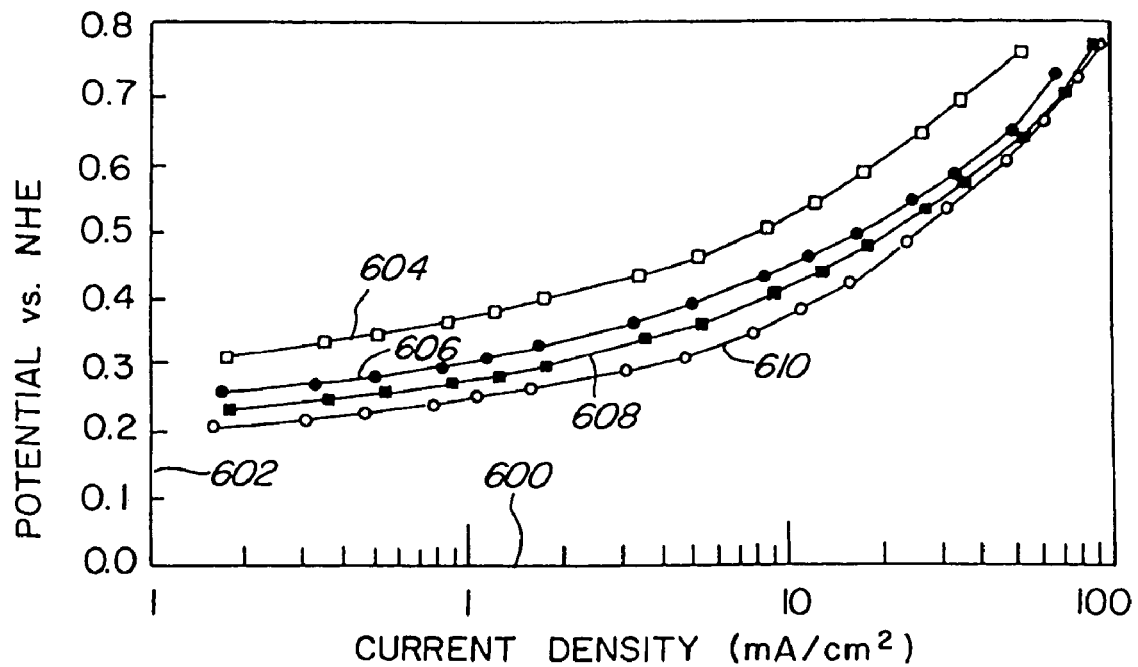
FIG. 16 is a graph illustrating polarization curves of a fuel cell using trimethoxymethane as a fuel for various fuel concentration levels within a half cell having a sulfuric acid electrolyte.
Figure 17:
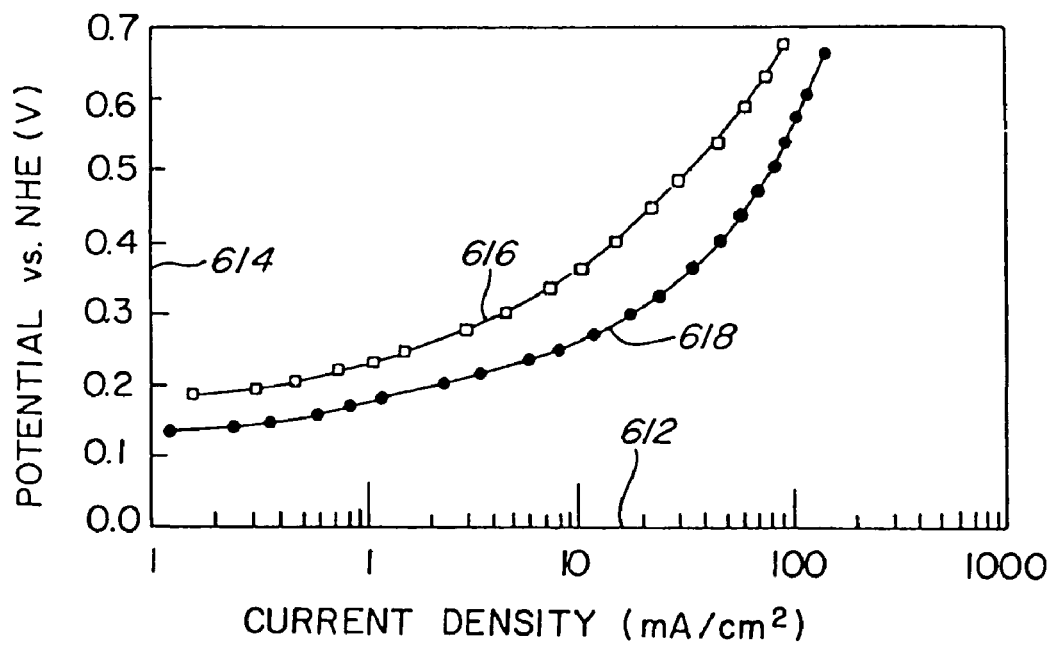
FIG. 17 is a graph illustrating polarization curves of a fuel cell using trimethoxymethane as a fuel for differing temperatures and concentrations within a half cell having a sulfuric acid electrolyte.
Figure 18:
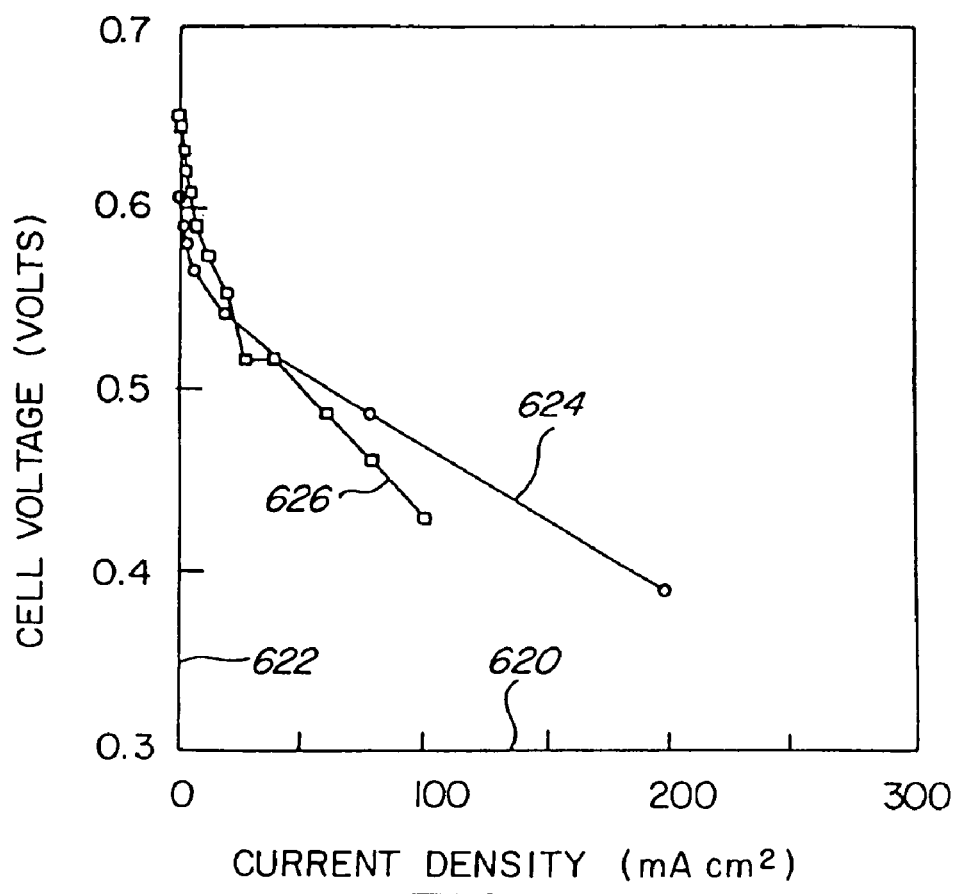
FIG. 18 is a graph illustrating cell voltage as a function of current density for the fuel cell of FIG. 1 using trimethoxymethane or methanol as a fuel.

FIGS. 16-18 illustrate the results of experiments conducted using trimethoxymethane (TMM) as a fuel for an organic direct liquid feed fuel cell. As with DMM described above, in use, TMM is mixed with water to a concentration in the range of about 0.1 to 2 M and fed into a fuel cell. Other concentrations may also be effective. The fuel cell may be of conventional design or may include one or more of the improvements described above. Within the fuel cell, the TMM is electro-oxidized at the anode of the cell. The electrochemical oxidation of TMM is represented by the following action:

$$(CH_3O)_3CH + 5H_2O \rightarrow 4CO_2 + 20H^+ + 20e^- \quad (5)$$

Experiments verifying the electro-oxidation of TMM have been performed in half-cells similar to the cell shown in FIG. 10 with temperature control using a Pt—Sn electrode with a 0.5 sulfuric acid electrolyte including 0.01 M C-8 acid. Results of these half-cell experiments are illustrated in FIGS. 16 and 17.

FIG. 16 provides galvanostatic polarization curves for several different concentrations of TMM for the above-mentioned Pt—Sn electrodes. The Pt—Sn electrodes were of the gas-diffusion type and consisted of 0.5 mg/cm$^2$ of total metal supported on Vulcan XC-72 obtained from Etek, Inc., Framingham, Mass. In FIG. 16, current density in mA/cm$^2$ is provided along axis 600 and polarization (in terms of potential v. NHE) is provided along axis 602. Curves 604, 606, 608 and 610, respectively, illustrate polarization for TMM concentrations Of 0.1 M, 0.5 M, 1 M and 2 M TMM. FIG. 16 shows that improved polarization is achieved at higher concentration levels. All measurements shown in FIG. 16 were obtained at room temperature.

It is found that TMM can be oxidized at potentials considerably more negative than methanol. Also, it has been found that temperature affects the oxidation rate of TMM. FIG. 17 illustrates polarization at two different concentrations and at two different temperatures. In FIG. 17, current density in mA/cm$^2$ is provided along axis 612 and polarization (in potential Y. NHE) is provided along axis 614. Curve 616 illustrates polarization for a 1 M TMM concentration at room temperature whereas curve 618 illustrates polarization for a 2 M concentration of TMM at 55° C. The curves of FIG. 17 were obtained using a Pt-Sn electrode in a 0.5 M sulfuric electrolyte including 0.01 M C-8 acid. As can be seen, improved polarization is achieved using a higher concentration at a higher temperature. A comparison of curve 618 of FIG. 17 with curve 610 of FIG. 16 illustrates that an increase in temperature yields an improved performance for the same concentration level. Although not shown, it has been found that at temperatures as high as 60° C., the rate of oxidation of TMM is twice that at 25° C.

In addition to the half cell experiments illustrated in FIGS. 16 and 17, full fuel cell experiments were also conducted to verify the effectiveness of TMM in a fuel cell. The direct oxidation of TMM in fuel cells was carried out in a liquid feed type fuel cell of the type illustrated above in FIGS. 1 and 2. Hence, the fuel cell used the proton conducting solid polymer membrane (Nafion™ 117) as the electrolyte. The membrane electrode assembly of the fuel cell included unsupported platinum-ruthenium catalyst layer (4 mg/cm$^2$) and gas-diffusion type unsupported platinum electrode (4 mg/cm$^2$) for the reduction of oxygen. The fuel cell used a 2 M solution of TMM on the fuel oxidation side and oxygen at 20 psi on the cathode.

As with DMM, an analysis of the oxidation products of TMM show only methanol and methanol is considered a possible intermediate in the oxidation of TMM to carbon dioxide and water. For fuel cells which are compatible with methanol, the presence of methanol as an intermediate product is not a concern because the methanol is ultimately oxidized to carbon dioxide and water.

The current-voltage characteristics of the above-described liquid feed direct oxidation fuel cell is shown in FIG. 18 for both TMM and methanol. Current density in mA/cm$^2$ is provided along axis 620 and cell voltage is provided along axis 622. Curve 624 shows cell voltage as a function of current density for a 1 M concentration of TMM. Curve 626 illustrates the same for a 1 M concentration of methanol. The measurements shown in FIG. 18 were obtained at 65° C.

Although not shown, at 90° C., cell voltages can reach 0.52 V at 300 mA/cm² with TMM which is higher than that attained with methanol.

Thus from both half-cell and full-cell measurements it has been found that TMM, like DMM, is capable of being oxidized at very high rates. Also like DMM, TMM is a non-toxic, low-vapor pressure liquid, permitting easy handling, and can be synthesized from natural gas (methane) by conventional methods.

Trioxane as a Fuel for a Liquid Feed Fuel Cell

Figure 19:
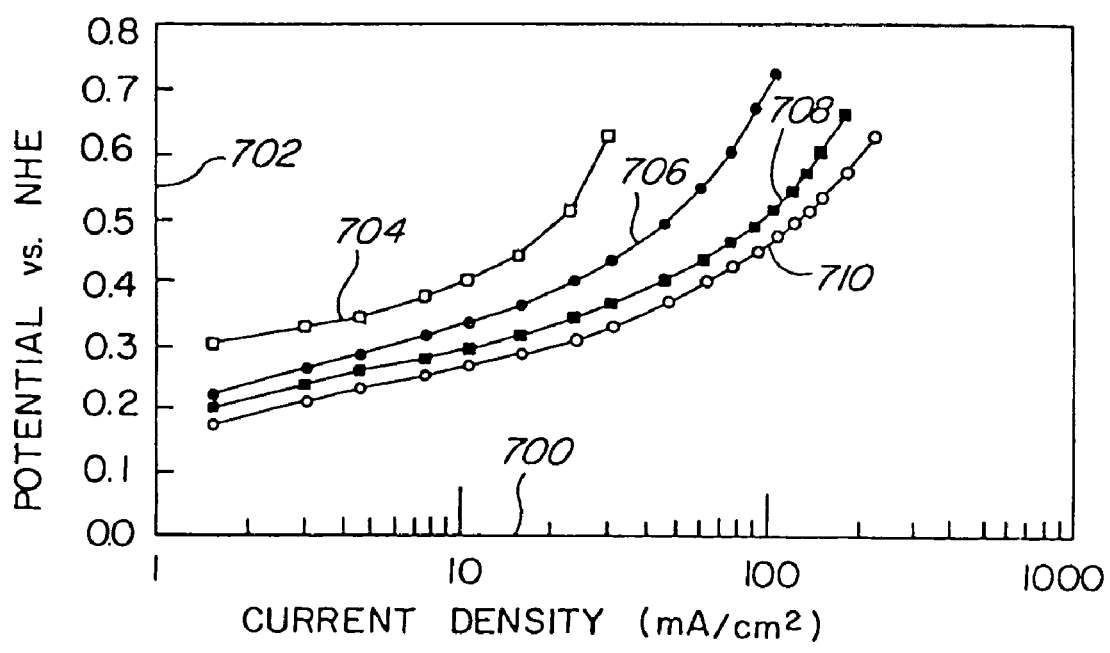
FIG. 19 is a graph illustrating polarization curves of a fuel cell using trioxane as a fuel for various fuel concentration levels within a half cell having a two molar sulfuric acid electrolyte.
Figure 20:
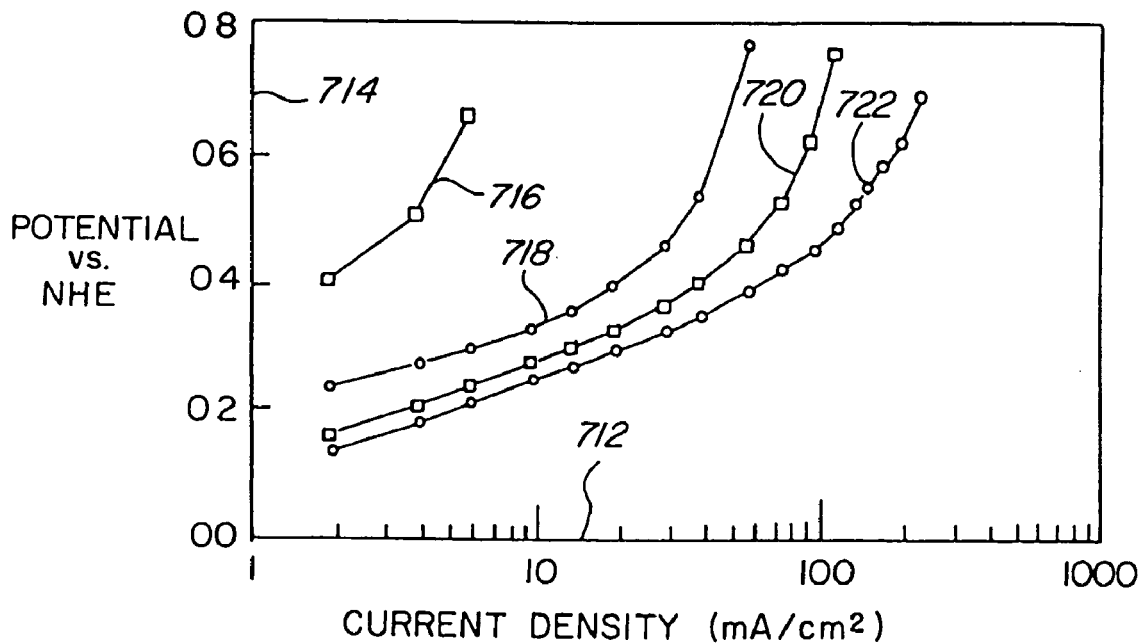
FIG. 20 is a graph illustrating polarization curves of a fuel cell using trioxane as a fuel for differing temperatures and concentrations of sulfuric acid electrolyte within a half cell.
Figure 21:
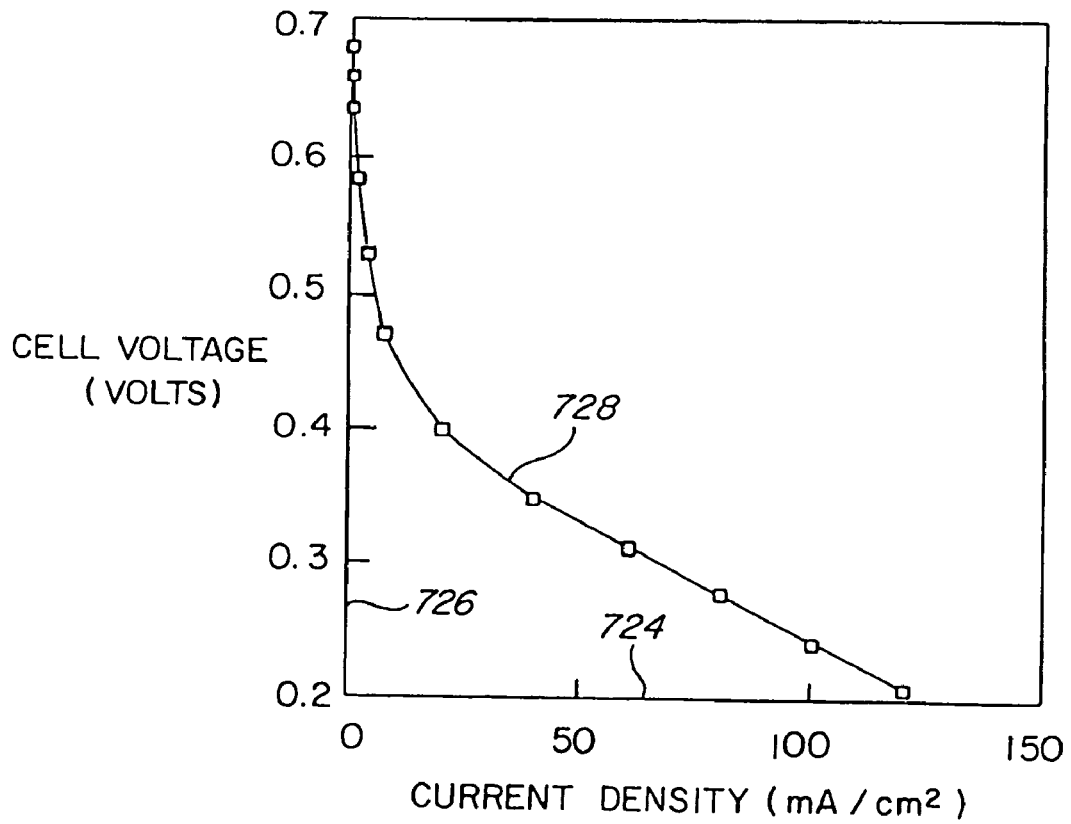
FIG. 21 is a graph illustrating cell voltage as a function of current density for the fuel cell of FIG. 1 using trioxane as fuel.

FIGS. 19-21 illustrate the results of experiments conducted using trioxane as a fuel for an organic direct liquid feed fuel cell. As with DMM and TMM described above, in use, trioxane is mixed with water to a concentration in the range of about 0.1 to 2 M and fed into a fuel cell. Other concentrations may also be effective. The fuel cell may be of conventional design or may include one or more of the improvements described above. Within the fuel cell, the trioxane is electro-oxidized at the anode of the cell. The electrochemical oxidation of trioxane is represented by the following action:

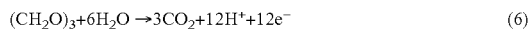

$$(CH_2O)_3 + 6H_2O \rightarrow 3CO_2 + 12H^+ + 12e^- \quad (6)$$

Experiments verifying the electro-oxidation of trioxane have been performed in half-cells similar to the cell shown in FIG. 10 with temperature control using Pt-Sn electrode with a 0.5 M to 2.0 M sulfuric acid electrolyte including 0.01 M C-8 acid. Results of these half-cell experiments are illustrated in FIGS. 19 and 20.

FIG. 19 provides galvanostatic polarization curves for several different concentrations of trioxane for the above-mentioned Pt-Sn electrodes. The Pt-Sn electrodes were of the gas diffusion type and consisted of 0.5 mg/cm² of the total noble metal supported on Vulcan XC-72 obtained from Etek, Inc., Framingham, Mass. In FIG. 19, current density in mA/cm² is provided along axis 700 and polarization (in terms of potential v. NHE) is provided along axis 702. Curves 704, 706, 708 and 710, respectively, illustrate polarization for trioxane at concentrations of 0.1 M, 0.5 M, 1 M and 2 M. FIG. 19 shows that improved polarization is achieved at higher concentration levels. All measurements shown in FIG. 19 were obtained at 55° C.

Hence, for trioxane, increasing fuel concentration results in increased rate of oxidation. Also, as can be seen from FIG. 19, current densities as high as 100 mA/cm² are achieved at potentials of 0.4 V vs. NHE. This performance is comparable to the performances achieved with formaldehyde. Although not shown, cyclic voltammetry studies have determined that the mechanism of oxidation of trioxane does not involve a breakdown to formaldehyde before electro-oxidation.

It has also been found that increasing the acid concentration of the electrolyte also results in increased rates of electro-oxidation. FIG. 20 illustrates polarization at four different electrolyte concentrations and at two different temperatures. In FIG. 20, current density in mA/cm² is provided along axis 712 and polarization (in potential v. NHE) is provided along axis 714. Curve 716 illustrates polarization for a 0.5 M electrolyte concentration at room temperature. Curve 718 illustrates polarization for a 0.5 M electrolyte concentration at 65° C. Finally, curve 722 illustrates polarization for a 2 M electrolyte concentration at 65 C. For ° all of curves 716-722, the trioxane concentration was 2 M.

The curves of FIG. 20 were obtained using a Pt-Sn electrode in a sulfuric acid electrolyte including 0.01 M C-8 acid. As can be seen, improved polarization is achieved using a higher electrolyte concentration at a higher temperature. Therefore it was projected that very high rates of electro-oxidation are expected with Nafion™ as an electrolyte since Nafion™ exhibits an acidity equivalent of 10 M sulfuric acid.

In addition to the half cell experiments illustrated in FIGS. 19 and 20, full fuel cell experiments were also conducted to verify the effectiveness of trioxane in a fuel cell. The direct oxidation of trioxane in fuel cells was carried out in a liquid feed type fuel cell of the type shown above in FIGS. 1 and 2. Hence, the fuel cell used the proton conducting solid polymer membrane (Nafion™ 117) as the electrolyte. The fuel cell used a 1 M solution of trioxane on the fuel oxidation side and oxygen at 20 psi on the cathode.

As with DMM and TMM, an analysis of the oxidation products of trioxane show only methanol and methanol is considered a possible intermediate in the oxidation of TMM to carbon dioxide and water. For fuel cells which are compatible with methanol, the presence methanol as an intermediate product is not a concern because the methanol is ultimately oxidized to carbon dioxide and water.

The current-voltage characteristics of the above-described liquid feed direct oxidation fuel cell is shown in FIG. 21 for trioxane. Current density in mA/cm² is provided along axis 724 and cell voltage is provided along axis 726. Curve 728 shows cell voltage as a function of current density for a 1 M concentration of trioxane. The measurements shown in FIG. 21 were obtained at 60° C. The performance illustrated in FIG. 21 may be improved considerably using platinum-tin electrodes, rather than Pt-Ru electrodes.

A measurement of crossover, not shown, in the trioxane/oxygen fuel cell suggests that a rate of crossover is at least 5 times lower than that in methanol fuel cells. The decreased rates of crossover are extremely desirable since, as described above, crossover affects the efficiency and performance of fuel cells.

Thus from both half-cell and full-cell measurements it has been found that trioxane, like DMM and TMM, is capable of being oxidized at very high rates.

CONCLUSION

What has been described are a variety of improvements to liquid feed fuel cells including improved electrolyte and electrode structures, improved methods for fabricating electrodes, additives for improving fuel performance and a set of three new fuels. The various improvements may be implemented separately or, for the most part, may be combined to achieve even more enhanced performance. It should be noted, however, that the above-described use of C-8 acid as an additive in a fuel is expected to be effective only for fuel cells employing an acid electrolyte such as sulfuric acid and may not be effective if employed using a fuel cell configured with a proton exchange membrane.

The methods of embodiments and experimental results shown herein are merely illustrative and exemplary of the invention and should not be construed as limiting the scope of the invention.

What is claimed is:

1. A direct methanol feed fuel-cell, comprising:
    a plurality of electrodes, including an anode and a cathode, and a proton conducting, solid polymer electrolyte between said anode and said cathode;
    a fuel connection, operating to allow circulating an organic fuel which is free of an acid electrolyte into contact with the anode;
    a second connection, allowing circulating air into contact with the cathode; and
    wherein at least said anode includes a porous structure with an additive that promotes uniform wetting of pores within said porous structure by said organic fuel.

2. A fuel-cell as in claim 1, wherein said cathode is a gas diffusion electrode.

3. A fuel-cell as in claim 1, wherein said cathode includes a platinum containing catalyst associated therewith.

4. A fuel-cell as in claim 1, wherein said cathode is formed on a carbon backing paper, and said catalyst is formed on the carbon backing paper at a loading between 0.5 and 4 mg per centimeter squared.

5. A fuel-cell as in claim 1, wherein said anode, said cathode, and said electrolyte are formed into a composite layered structure.

6. A fuel cell as in claim 1, wherein said fuel is a methanol-containing fuel.

7. A fuel-cell as in claim 5, wherein said electrolyte membrane is a perfluorinated sulfonic acid polymer membrane.

8. A fuel-cell as in claim 5, wherein said cathode is a gas diffusion electrode.

9. A fuel-cell as in claim 5, wherein said organic fuel is a methanol containing fuel.

10. A method of forming a direct methanol feed fuel-cell, comprising:
    obtaining a backing material for use in forming a porous anode structure;
    forming an additive within the anode that promotes uniform wetting of the pores of the anode;
    adding an electrocatalyst to the anode;
    attaching the anode to a solid electrolyte membrane, and attaching said electrolyte membrane to a cathode; and
    carrying out a chemical reaction by flowing organic fuel which is substantially free of acid electrolyte into contact with the anode.

11. A method as in claim 10, wherein said flowing comprises flowing methanol to the anode.

12. A fuel cell, comprising:
    a plurality of electrodes, including an anode and a cathode;
    a solid polymer electrolyte, coupled to and between said anode and cathode;
    a first connection operating to allow circulating an organic fuel which is free of an acid electrolyte into contact with the anode;
    a second connection, allowing bringing air into contact with the cathode; and
    a gas separator operating to receive an output product from the fuel cell, and to separate gas within said output product from liquid within said output product, wherein said gas separator is formed of a microporous material; and
    a recovery unit that recovers water from said output product after separating.

13. A fuel-cell as in claim 12, wherein said gas separators separates carbon dioxide from water.

14. A fuel-cell as in claim 12, wherein said cathode is a gas diffusion cathode with electrocatalyst particles.

15. A fuel-cell as in claim 14, wherein said cathode is treated with the material that aids in removal of water.

16. A fuel-cell as in claim 15, wherein said material is a hydrophobic material.

17. A fuel-cell as in claim 15, wherein said material is polytetrafluoroethylene.

18. A fuel cell as in claim 17, wherein the cathode contains 10-50% polytetrafluoroethylene by weight.

19. A fuel cell as in claim 15, wherein the cathode contains the material at a loading that is effective to create a three-phase boundary.

20. A fuel cell as in claim 12, wherein the organic fuel is a methanol containing fuel.

21. A method of operating a direct fed methanol fuel-cell, comprising:
    circulating an organic fuel which is substantially free of an acid electrolyte to an anode of a direct methanol fuel cell that has a solid polymer electrolyte coupled to said anode, and a cathode coupled to said solid polymer electrolyte, and circulating air to said cathode to allow an electrochemical reaction which produces electricity and also produces an output product including water and gas; and
    separating said gas from said water in said output product using a microporous material to carry out the separating; and
    recycling the water after said separating.

22. A method as in claim 21, wherein said gas includes carbon dioxide.

23. A method as in claim 21, wherein said separating comprises using a material which allows gas to pass without passing liquid to separate said water from said gas.

24. A method as in claim 21, wherein said cathode is a gas diffusion cathode with electrocatalyst particles therein.

25. A method as in claim 24, wherein said cathode is treated with a hydrophobic material to aid in removing all of water.

26. A method as in claim 25, wherein the cathode contains said hydrophobic material in an amount which is effective to maintain a three-phase boundary.

27. A method as in claim 21, wherein said organic fuel is a methanol containing fuel.

28. A direct fed methanol fuel-cell, comprising:
    a composite layered structure including an anode, a cathode, and a solid polymer electrolyte between said anode and cathode and adapted to operate with an organic fuel which is substantially free of acid electrolyte;
    a gas separator, located adjacent said cathode, and operating to separate gas from a liquid.

29. A fuel-cell as in claim 28 further comprising:
    means for circulating said organic fuel to said anode;
    means for circulating gas to said cathode; and
    wherein said gas separator operates to separate gas from liquid within an output product of the fuel-cell after an electrochemical reaction.

30. A fuel-cell as in claim 28, further comprising a fuel supply, which supplies said organic fuel to said anode to carry out an electrochemical reaction.

31. A fuel-cell as in claim 30, wherein said gas separator is a material which is permeable to gas but impermeable to liquid.

32. A fuel-cell as in claim 31, wherein said material is a microporous material.

33. A fuel-cell as in claim 28, wherein said cathode includes a treatment to reduce liquid permeation into said cathode.

34. A fuel cell as in claim 32, wherein the cathode contains a hydrophobic material at a loading that is effective to create a three-phase boundary.

35. A fuel cell as in claim 29, wherein the organic fuel is a methanol containing fuel.

36. A method, comprising:
    carrying out an electrochemical reaction in a fuel-cell which involves introducing an organic fuel which is substantially free of acid electrolyte into an area of an anode of a direct methanol fuel cell that has a solid polymer electrolyte coupled to said anode, and a cathode coupled to said solid polymer electrolyte, to carry out a chemical reaction that produces electricity and releases water and gas; and
    in an area of flow of said cathode, separating the water from the gas using a material that passes only one of water or gas, and reintroducing recovered water into an area of said anode.

37. A method as in claim 36, wherein said using a material comprises using a micro porous material.

38. A method as in claim 36, wherein said carrying out an electrochemical reaction comprises electrochemically processing a methanol containing fuel.

39. A method as in claim 38, further comprising treating the anode to allow improved wetting by the methanol containing fuel.

40. A method as in claim 38, further comprising treating at least one of said anode and/or cathode with an electrochemical catalyst material.

41. A method as in claim 40, wherein said electrochemical catalyst material is a platinum containing material.

* * * * *